(12) United States Patent
Kimura et al.

(10) Patent No.: US 11,990,596 B2
(45) Date of Patent: May 21, 2024

(54) BATTERY UNIT

(71) Applicant: HONDA MOTOR CO., LTD., Tokyo (JP)

(72) Inventors: Yasutomo Kimura, Tokyo (JP); Jaewon Son, Tokyo (JP); Hiroki Sakamoto, Tokyo (JP); Hiroshi Kano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 17/867,014

(22) Filed: Jul. 18, 2022

(65) Prior Publication Data

US 2023/0028267 A1 Jan. 26, 2023

(30) Foreign Application Priority Data

Jul. 21, 2021 (JP) ................. 2021-121045

(51) Int. Cl.
*H01M 10/6563* (2014.01)
*H01M 10/46* (2006.01)
*H01M 10/613* (2014.01)
*H01M 10/625* (2014.01)

(52) U.S. Cl.
CPC ....... *H01M 10/6563* (2015.04); *H01M 10/46* (2013.01); *H01M 10/613* (2015.04); *H01M 10/625* (2015.04); H01M 2220/20 (2013.01)

(58) Field of Classification Search
CPC ......... H01M 10/6563; H01M 10/6565; H01M 10/46; H02J 7/00; B60K 2001/004; B60K 2001/005

See application file for complete search history.

(56) References Cited

U.S. PATENT DOCUMENTS

| 10,756,401 | B2 * | 8/2020 | Inoue .................. H01M 10/613 |
| 2016/0344073 | A1 | 11/2016 | Hayashi et al. |
| 2018/0050606 | A1 | 2/2018 | Sugitate et al. |
| 2018/0331402 | A1 | 11/2018 | Inoue |
| 2019/0210483 | A1 | 7/2019 | Sugitate et al. |

(Continued)

FOREIGN PATENT DOCUMENTS

| JP | 2004-345447 A | 12/2004 |
| JP | 2016-219260 A | 12/2016 |

(Continued)

OTHER PUBLICATIONS

Jun. 6, 2023, Translation of Japanese Office Action issued for related JP Application No. 2021-121045.

(Continued)

*Primary Examiner* — Amanda J Barrow
(74) *Attorney, Agent, or Firm* — Paratus Law Group, PLLC

(57) ABSTRACT

A battery unit includes at least one battery module, a cooling device configured to deliver a cooling gas configured to cool the battery module to the battery module, and a junction board mounted with a wiring component configured to electrically connect the battery module and an external device and allow a charging power and/or a discharging power of the battery module to flow. The junction board is disposed above the cooling device at a position where at least a part of the junction board overlaps the cooling device when viewed from an upper-lower direction.

7 Claims, 10 Drawing Sheets

(56) References Cited

U.S. PATENT DOCUMENTS

2019/0305390 A1    10/2019   Asakura et al.
2021/0146764 A1*    5/2021   Kim ...................... B60K 11/06
2022/0093956 A1*    3/2022   Terashima .......... H01M 50/503

FOREIGN PATENT DOCUMENTS

| JP | 2018-190660 A | 11/2018 |
| JP | 2019-123366 A | 7/2019 |
| JP | 2019-179595 A | 10/2019 |
| WO | WO 2016/143214 A1 | 9/2016 |
| WO | WO 2017/051521 A1 | 3/2017 |

OTHER PUBLICATIONS

Jun. 6, 2023, Japanese Office Action issued for related JP Application No. 2021-121045.
Nov. 7, 2023, Japanese Notice of Allowance issued for related JP Application No. 2021-121045.
Aug. 2, 2023, Japanese Written Amendment issued for related JP Application No. 2021-121045.
Aug. 2, 2023 Japanese Written Opinion issued for related JP Application No. 2021-121045.

* cited by examiner

BATTERY UNIT

CROSS-REFERENCE TO RELATED APPLICATIONS

This application is based on and claims priority under 35 USC 119 from Japanese Patent Application No. 2021-121045 filed on Jul. 21, 2021.

TECHNICAL FIELD

The present disclosure relates to a battery unit. In particular, the present disclosure relates to a battery unit mounted on a vehicle.

BACKGROUND ART

In recent years, as a specific measure against global climate change, efforts for realizing a low-carbon society or a decarbonized society have become active. Also in a vehicle, a $CO_2$ emission is strongly required to be reduced, and electrification of a drive source is progressing rapidly. Specifically, a vehicle, such as an electrical vehicle or a hybrid electrical vehicle, including an electric motor as a drive source for the vehicle and a battery as a secondary battery capable of supplying a power to the electric motor is being developed.

Along with the electrification of the drive source of the vehicle, a high-capacity battery unit is mounted on the vehicle. Since the high-capacity battery unit has a large amount of heat generation, higher cooling performance is required.

JP-A-2018-190660 discloses a battery unit provided in an installation space under, for example, a seat of a hybrid vehicle. In the battery unit of JP-A-2018-190660, a first fan, a second fan, and a control unit are provided adjacent to each other in a vertical direction of a battery module. The control unit is disposed between the first fan and the second fan, and the first fan and the second fan function as exhaust fans which discharge a cooling gas which has cooled the battery module toward an outside in the vertical direction.

However, there is a problem that since the battery unit of JP-A-2018-190660 has the installation space under the seat, air which is heated by heat generated in the control unit stays between the seat and an upper surface of the battery module, and the air which is heated by the heat generated in the control unit is supplied to the battery module by the first fan and the second fan as a part of the cooling gas for cooling the battery module, and thus the cooling performance is decreased. Meanwhile, in the battery unit of JP-A-2018-190660, also in a case where in order to supply the cooling gas to the battery module more reliably, the first fan and the second fan are used as intake fans, and the cooling gas exhausted from the first fan and the second fan is supplied to the battery module, there is a problem that the heat generated by the control unit is delivered to the first fan and the second fan, and a temperature of the cooling gas supplied to the battery module rises.

SUMMARY OF INVENTION

The present disclosure provides a battery unit capable of supplying a lower-temperature cooling gas to a battery module and having an improved cooling performance.

According to an aspect of the present disclosure, there is provided a battery unit, including:
at least one battery module;
a cooling device configured to deliver a cooling gas configured to cool the battery module to the battery module; and
a junction board mounted with a wiring component configured to electrically connect the battery module and an external device and allow a charging power and/or a discharging power of the battery module to flow, in which:
the junction board is disposed above the cooling device at a position where at least a part of the junction board overlaps the cooling device when viewed from an upper-lower direction.

According to the present disclosure, the heat generated in the junction board can be prevented from being transferred to the cooling device, and thus the cooling gas supplied from the cooling device to the battery module can be prevented from rising in temperature due to the heat generated in the junction board. Accordingly, a lower-temperature cooling gas can be supplied to the battery module, and a cooling performance of the battery unit is improved.

DESCRIPTION OF EMBODIMENTS

Figure 1:
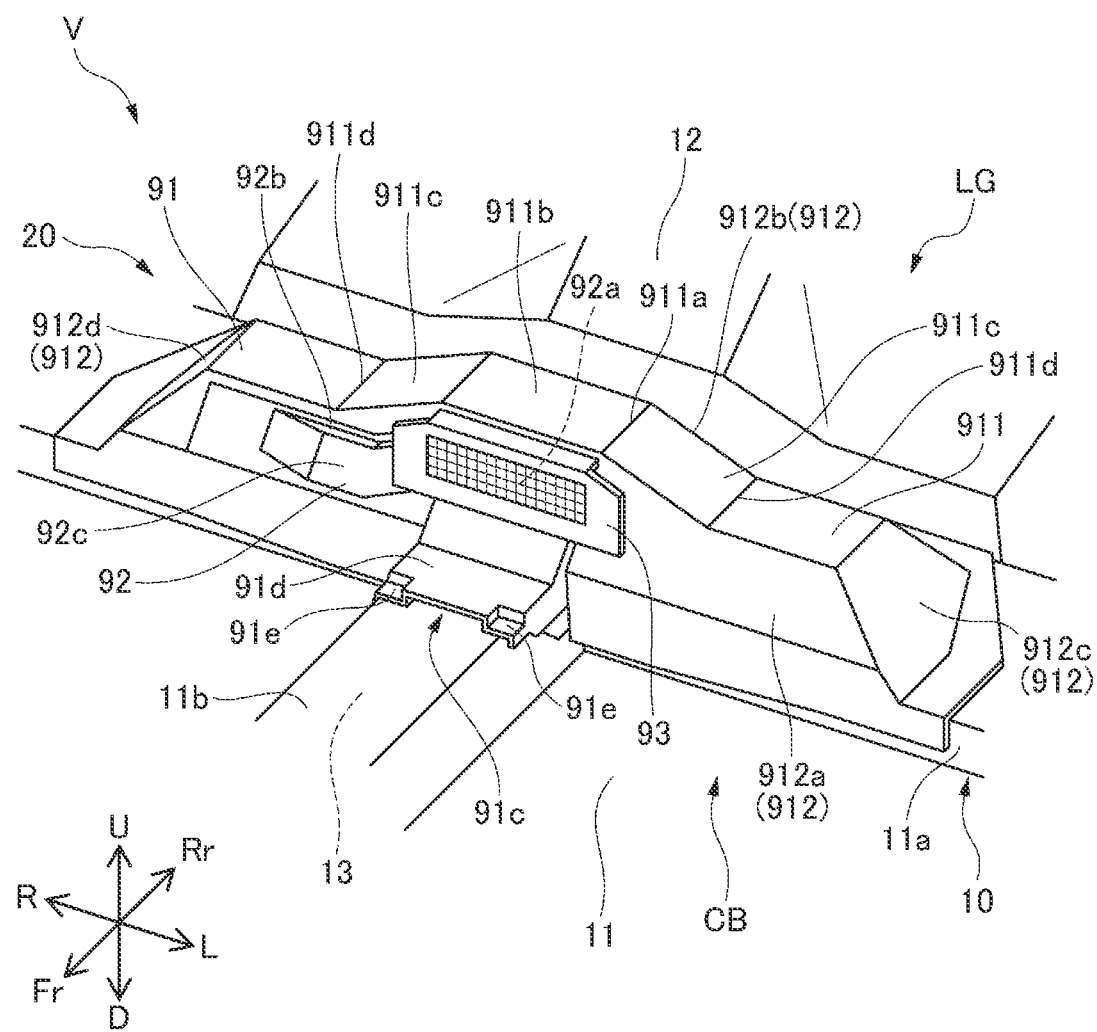
FIG. 1 is a perspective view of a periphery of a rear seat of a vehicle equipped with a battery unit according to an embodiment of the present disclosure as viewed from a front oblique upper side.

Hereinafter, an embodiment of a battery unit of the present disclosure will be described with reference to accompanying drawings. In the present embodiment, the battery unit is mounted on a vehicle. It should be noted that the drawings are viewed in direction of reference numerals. In the present specification and the like, in order to simplify and clarify the description, a front-rear direction, a left-right direction, and an upper-lower direction are described in accordance with directions viewed from a driver of a vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

<Vehicle>

Figure 2:
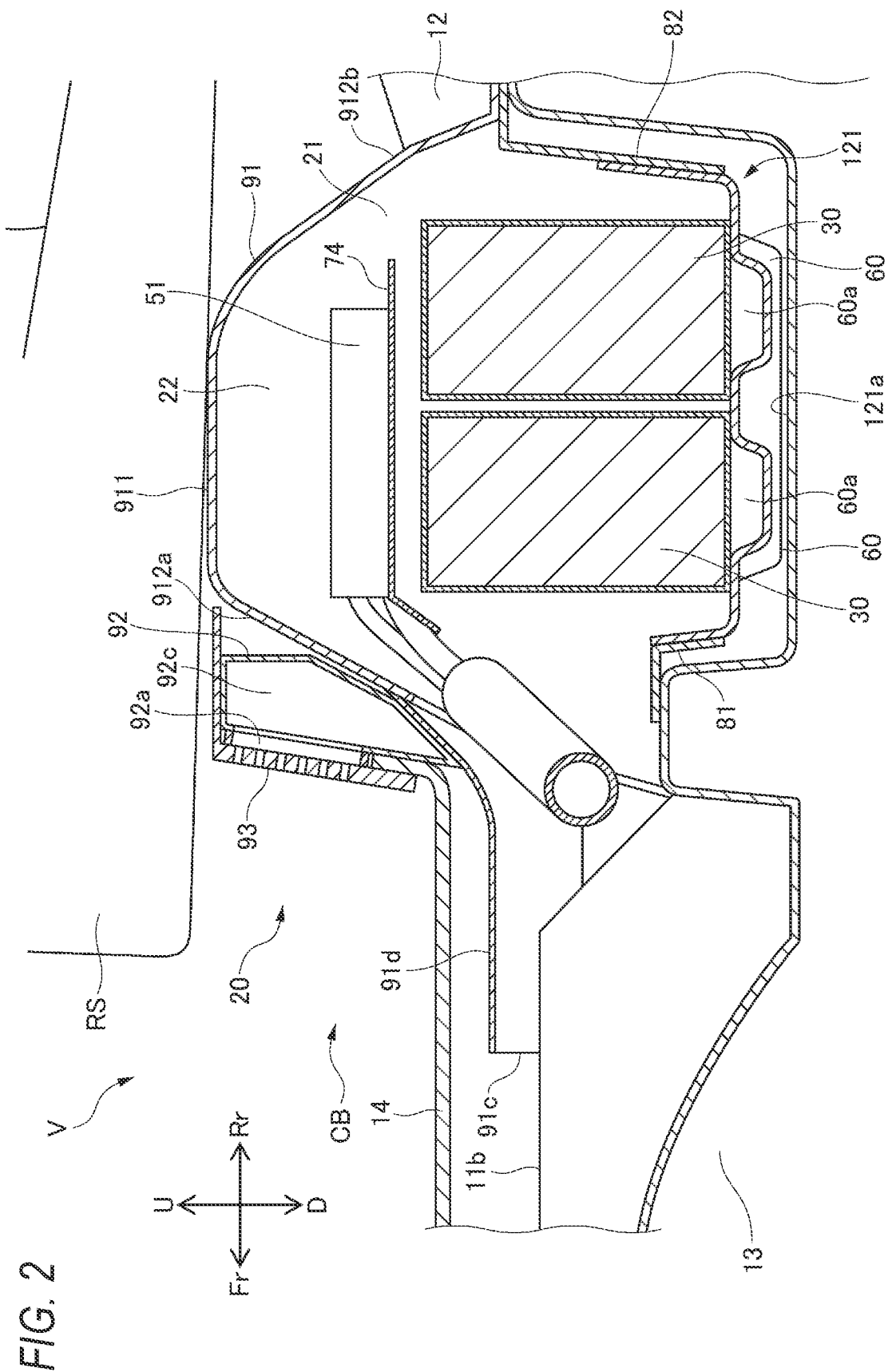
FIG. 2 is a cross-sectional view of a vicinity of the battery unit of the vehicle equipped with the battery unit of FIG. 1 as viewed from a left side.

As illustrated in FIGS. 1 and 2, a battery unit 20 of the present embodiment is mounted on a vehicle V. The vehicle V is, for example, an electric vehicle, such as a hybrid vehicle or a battery-powered vehicle, equipped with a drive electric motor (not illustrated) capable of driving the vehicle V by a power stored in the battery unit 20. The battery unit 20 is mounted on a floor panel 10 and fixed to the floor panel 10. A rear seat RS of the vehicle V is disposed above the battery unit 20.

The floor panel 10 includes a front floor panel 11 which constitutes a floor portion of a vehicle cabin CB, and a rear floor panel 12 which constitutes a floor portion and the like of a luggage compartment LG provided behind the vehicle cabin CB. The front floor panel 11 and the rear floor panel 12 are connected below the rear seat RS. Two end portions of the floor panel 10 in a vehicle width direction are connected to a pair of left and right skeletal frame members (not illustrated) which extend along the front-rear direction. Accordingly, the floor panel 10 is fixed to the skeletal frame members.

A kick-up portion 11a which rises upward is formed at a rear end portion of the front floor panel 11. A center tunnel 11b is formed along the front-rear direction at a central portion of the front floor panel 11 in the vehicle width direction. The center tunnel 11b is bent such that the front floor panel 11 protrudes upward. A trapezoidal tunnel space 13 is formed below the center tunnel 11b.

An accommodation recessed portion 121 is formed at a front end portion of the rear floor panel 12. The accommodation recessed portion 121 includes a rectangular bottom wall portion 121a which is long in the vehicle width direction, and the battery unit 20 is mounted on the bottom wall portion 121a.

<Power Supply Device>

As illustrated in FIGS. 1 to 5, the battery unit 20 includes two battery modules 30, a cooling device 40 through which a cooling gas for cooling the battery modules 30 flows, a battery control device 51 which controls charging and discharging of the battery modules 30, a junction board 52 which is equipped with a wiring component which electrically connects the battery modules 30 and an external device (not illustrated) and allows a charging power and a discharging power of the battery module 30 to flow, and a service plug 53 which is capable of cutting off the powers flowing through the junction board 52.

The battery unit 20 includes a base plate 60 on which the two battery modules 30 are mounted, and a front frame 81 and a rear frame 82 which cover a bottom of the base plate 60 and are fixed to the base plate 60. The base plate 60 is mounted on the bottom wall portion 121a of the accommodation recessed portion 121 recessed in the front end portion of the rear floor panel 12.

The battery module 30 has a substantially rectangular parallelepiped shape which is long in the vehicle width direction. The two battery modules 30 are arranged so as to face each other in the front-rear direction. Each battery module 30 has a plurality of battery cells 31 stacked in the vehicle width direction. The battery cell 31 has a substantially rectangular parallelepiped shape which is shortest in the vehicle width direction.

The cooling device 40, the junction board 52, and the service plug 53 are disposed on a right side of the battery module 30. The cooling device 40 and the junction board 52 are provided at a position where at least a part of each of the cooling device 40 and the junction board 52 overlaps the battery modules 30 when viewed from the vehicle width direction.

Accordingly, the cooling device 40 and the junction board 52 can be disposed in the battery unit 20 while reducing a front-rear direction dimension and a height dimension of the battery unit 20.

The cooling device 40 includes a fan 41 which blows the cooling gas for cooling the battery modules 30, an introduction duct 42 which introduces the cooling gas into the fan 41, and a delivery duct 43 which delivers the cooling gas blown from the fan 41 in a desired direction.

The fan 41 is mounted on the base plate 60. The fan 41 is provided at a position where at least a part of the fan 41 overlaps the battery modules 30 when viewed from the vehicle width direction. The fan 41 includes an impeller 41a which aspirates the cooling gas from a rotation axis direction and blows the cooling gas in a centrifugal direction, and a fan case 41b which pivotably supports and accommodates the impeller 41a. The fan case 41b includes an aspiration port 41c which aspirates the cooling gas supplied to the impeller 41a, and an outlet 41d which discharges the cooling gas blown from the impeller 41a. In the present embodiment, a rotation axis of the impeller 41a extends in the upper-lower direction. The fan case 41b has a substantially cylindrical shape which extends in the upper-lower direction. The aspiration port 41c opens upward. The outlet 41d protrudes to a left side from the fan case 41b having the substantially cylindrical shape, and opens to the left side. Therefore, the fan 41 aspirates the upper side cooling gas through the aspiration port 41c and delivers the cooling gas through the outlet 41d to the left side.

The introduction duct 42 is disposed on an upper side of the fan 41. The introduction duct 42 is provided adjacent to an upper part of the fan 41 and covers the upper part of the fan 41. The introduction duct 42 is provided at a position where at least a part of the introduction duct 42 overlaps the battery modules 30 when viewed from the vehicle width direction. A flow path 42a through which the cooling gas flows is formed in the introduction duct 42. An introduction port 42b which opens diagonally upward and forward is provided on one end side of the flow path 42a. A discharge port 42c which opens downward and is connected to the aspiration port 41c of the fan case 41b is provided on the other end side of the flow path 42a. In the introduction duct 42, the cooling gas for cooling the battery modules 30 is introduced into the flow path 42a from the introduction port 42b, flows through the flow path 42a, and is aspirated into the aspiration port 41c of the fan 41 through the discharge port 42c.

A pair of front and rear positioning pins 42d which project downward in a substantially columnar shape are provided at a left end portion of the introduction duct 42. The positioning pin 42d has a substantially cylindrical shape with a tapered tip.

The delivery duct 43 is provided adjacent to a left side of the fan 41 and is connected to the outlet 41d of the fan case 41b. The delivery duct 43 delivers the cooling gas blown from the outlet 41d of the fan case 41b toward the left side along lower surfaces of the battery modules 30. Details of the delivery duct 43 will be described later.

The battery control device 51 has a substantially rectangular parallelepiped shape which is shortest in the upper-lower direction, and is arranged at a position facing upper surfaces of the battery modules 30 so as to straddle the two battery modules 30 arranged in the front-rear direction.

The junction board 52 has a substantially rectangular parallelepiped shape which is shortest in the upper-lower direction, and is disposed above the cooling device 40 at a position where at least a part of the junction board 52 overlaps the cooling device 40 when viewed from the upper-lower direction. Therefore, the introduction duct 42 of the cooling device 40 is disposed between the junction board 52 and the fan 41 in the upper-lower direction. The junction board 52 is provided at a position where at least a part of the junction board 52 overlaps the battery modules 30 when viewed from the vehicle width direction.

The service plug 53 is provided on a wiring member which electrically connects the external device (not illustrated) and the junction board 52, and is a plug which can be manually inserted and removed. When the service plug 53 is inserted, the external device (not illustrated) and the junction board 52 are electrically connected, and when the service plug 53 is removed, the external device (not illustrated) and the junction board 52 are electrically isolated. The service plug 53 is disposed in front of the junction board 52. The service plug 53 is provided at a position where at least a part of the service plug 53 overlaps the junction board 52 when viewed from the front-rear direction.

Figure 3:
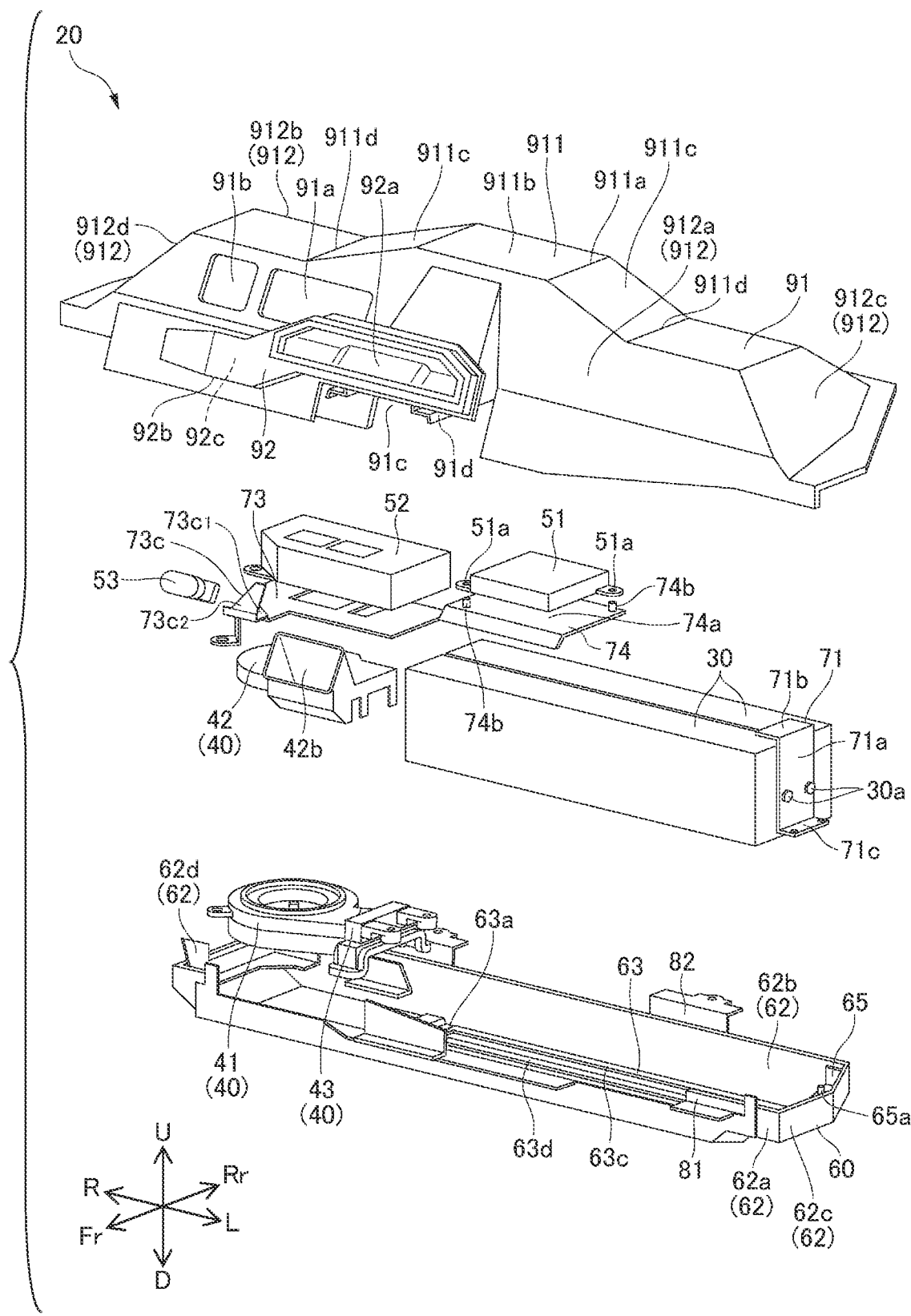
FIG. 3 is an exploded perspective view of the battery unit according to an embodiment of the present disclosure.
Figure 4:
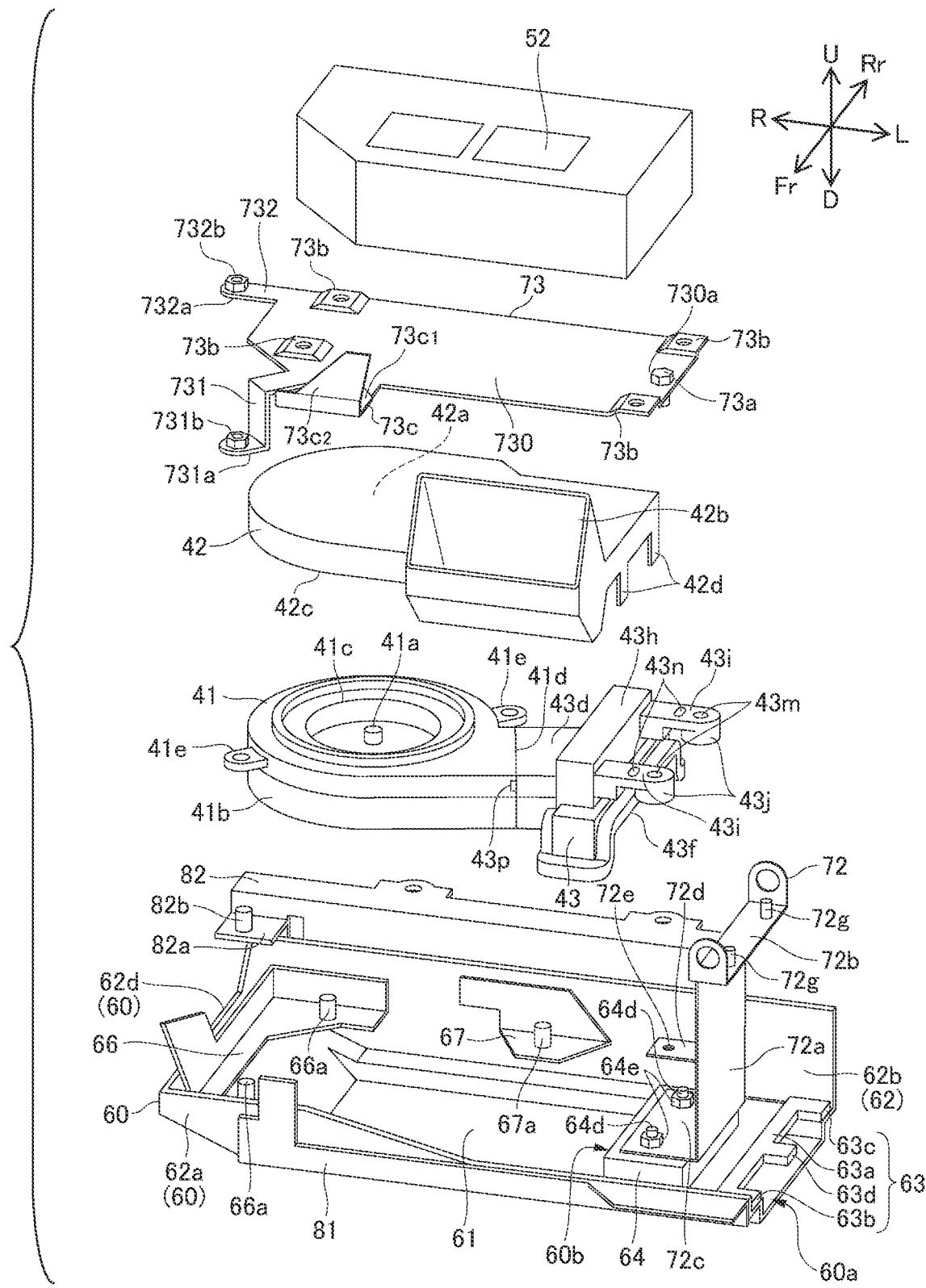
FIG. 4 is an exploded perspective view of a main part of a cooling device, a junction board bracket, a junction board, and a base plate in the battery unit of FIG. 3.
Figure 5:
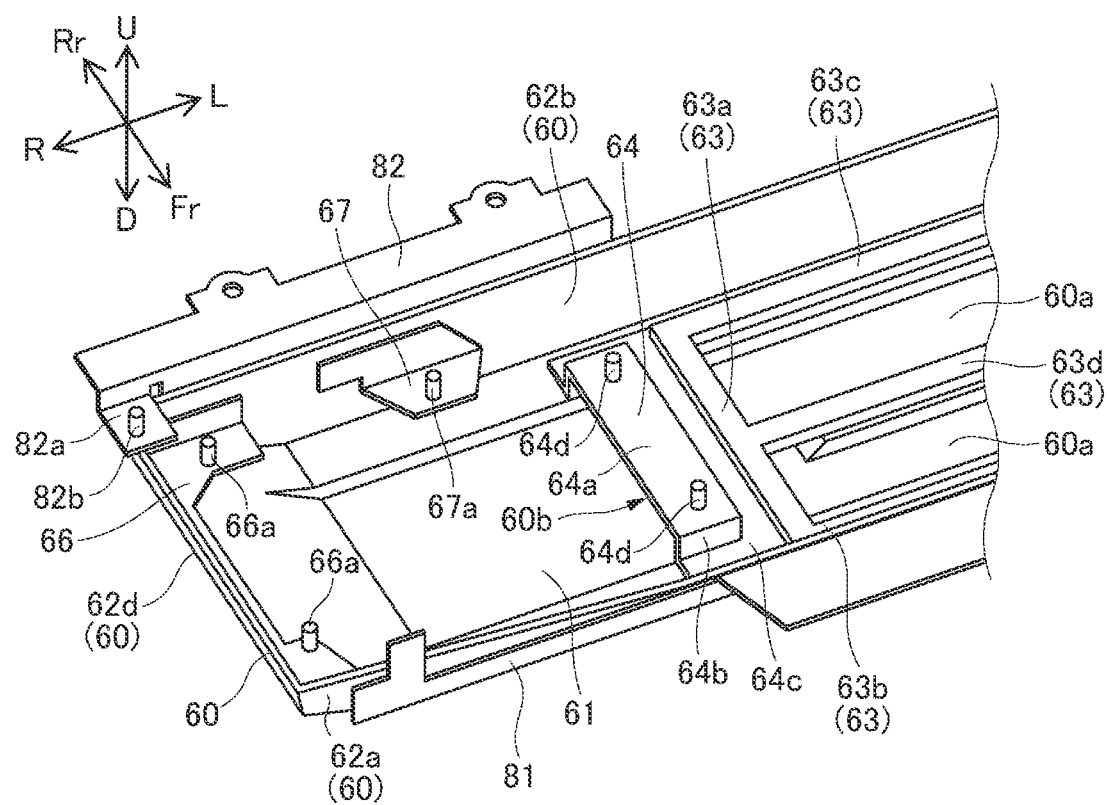
FIG. 5 is a perspective view of a vicinity of a right end portion of a base plate of FIG. 3.

As illustrated in FIGS. 3 to 5, the base plate 60 includes a bottom wall portion 61 which covers bottoms of the two battery modules 30 and the cooling device 40 disposed on a right side of the battery module 30, and a side wall portion 62 which bends upward from front, rear, left, and right outer edge portions of the bottom wall portion 61, surrounds the front, rear, left, and right outer edge portions of the bottom wall portion 61, and extends in the upper-lower direction. The side wall portion 62 includes a front wall portion 62a which is bent upward from an front edge portion of the bottom wall portion 61, a rear wall portion 62b which is bent upward from a rear edge portion of the bottom wall portion 61, a left wall portion 62c which is bent upward from a left edge portion of the bottom wall portion 61, and a right wall portion 62d which is bent upward from a right edge portion of the bottom wall portion 61.

The base plate 60 further includes a sealing member 63 fixed to an upper surface of the bottom wall portion 61 and extending in the vehicle width direction. The sealing member 63 is formed of a material which is impermeable to a gas. In the present embodiment, the sealing member 63 is formed of a rubber foam having adhesive layers formed on an upper surface and a lower surface. The adhesive layer formed on the lower surface of the sealing member 63 adheres to the upper surface of the bottom wall portion 61 of the base plate 60, whereby the sealing member 63 is fixed to the upper surface of the bottom wall portion 61 so as not to form a gap between the sealing member 63 and the upper surface of the bottom wall portion 61. The sealing member 63 includes a pair of left and right side sealing members 63a which extend in the front-rear direction, a front sealing member 63b which connects front end portions of the pair of left and right side sealing members 63a and extends in the vehicle width direction, a rear sealing member 63c which connects the front end portions of the pair of left and right side sealing members 63a and extends in the vehicle width direction, and a central sealing member 63d which connects substantially central portions in the front-rear direction of the pair of left and right side sealing members 63a and extends in the vehicle width direction. The pair of left and right side sealing members 63a are located at substantially the same position as left end portions and right end portions of the battery modules 30 in the left-right direction, and each extend in the front-rear direction from substantially the same position as the front end portion of the battery module 30 arranged in the front side to substantially the same position as the rear end portion of the battery module 30 arranged in the rear side. The front sealing member 63b, the rear sealing member 63c, and the central sealing member 63d are extended in the vehicle width direction from substantially the same position as the left end portion of the battery module 30 to substantially the same position as the right end portion of the battery module 30 in the left-right direction, respectively.

The two battery modules 30 are mounted on the sealing member 63. In the two battery modules 30, the battery module 30 arranged on the front side is mounted such that the front end portion is supported by the front sealing member 63b of the sealing member 63 and a rear end portion is supported by the central sealing member 63d of the sealing member 63. Then, the front sealing member 63b and the central sealing member 63d are compressed by a weight of the battery module 30 arranged on the front side, and the adhesive layers formed on the upper surfaces of the front sealing member 63b and the central sealing member 63d adhere to the lower surface of the battery module 30 arranged in the front side, whereby the battery module 30 arranged in the front side is fixed to the upper surfaces of the front sealing member 63b and the central sealing member 63d so as not to form a gap between the battery module 30 and the upper surfaces of the front sealing member 63b and the central sealing member 63d. In the two battery modules 30, the battery module 30 arranged in the rear side is mounted such that a front end portion is supported by the central sealing member 63d of the sealing member 63 and the rear end portion is supported by the rear sealing member 63c of the sealing member 63. Then, the central sealing member 63d and the rear sealing member 63c are compressed by a weight of the battery module 30 arranged on the rear side, and the adhesive layers formed on the upper surfaces of the central sealing member 63d and the rear sealing member 63c adhere to the lower surface of the battery module 30 arranged in the rear side, whereby the battery module 30 arranged in the rear side is fixed to the upper surfaces of the central sealing member 63d and the rear sealing member 63c so as not to form a gap between the battery module 30 and the upper surfaces of the central sealing member 63d and the rear sealing member 63c. Accordingly, a flow path 60a through which the cooling gas for cooling the battery module 30 flows is formed between the lower surface of the battery module 30 and the bottom wall portion 61 of the base plate 60 with the sealing member 63 interposed therebetween. In the present embodiment, two flow paths 60a are formed. One flow path 60a is surrounded by the lower surface of the battery module 30 arranged on the front side, the bottom wall portion 61 of the base plate 60, the pair of left and right side sealing members 63a, the front sealing member 63b, and the central sealing member 63d, and the other flow path 60a is surrounded by the lower surface of the battery module 30 arranged in the rear side, the bottom wall portion 61 of the base plate 60, the pair of left and right side sealing members 63a, the central sealing member 63d, and the rear sealing member 63c. The lower surface of the battery module 30 arranged on the front side and the bottom wall portion 61 of the base plate 60 are fixed to the sealing member 63, which is impermeable to a gas, without any gap, and the lower surface of the battery module 30 arranged in the rear side and the bottom wall portion 61 of the base plate 60 are fixed to the sealing member 63, which is impermeable to a gas, without any gap, so that the gas flowing through the two flow paths 60a does not leak to outsides of the flow paths 60a from the lower surfaces of the battery modules 30 and the bottom wall portion 61 of the base plate 60.

The base plate 60 further includes a plate-shaped support member 64 fixed to the upper surface of the bottom wall portion 61 and extending in the front-rear direction. The support member 64 has a main surface 64a which extends in the front-rear direction and the vehicle width direction, a side wall portion 64b which bends downward from a front edge portion, a rear edge portion, and a left edge portion of the main surface 64a and extends in the upper-lower direction around the front edge portion, the rear edge portion, and the left edge portion of the main surface 64a, and a flange portion 64c which extends in a flange shape from a lower end portion of the side wall portion 64b. Therefore, the side wall portion 64b and the flange portion 64c have a U-shape which opens to the right when viewed from the upper-lower direction. A lower surface of the flange portion 64c is in contact with the bottom wall portion 61 of the base plate 60 and is fixed to the bottom wall portion 61. The support member 64 is provided such that the right side sealing member 63a of the sealing member 63 is disposed on an upper surface of the flange portion 64c of a portion extending to a left side of the left edge portion of the main surface 64a. That is, the support member 64 is sandwiched in the upper-lower direction by the bottom wall portion 61 and a right side sealing member 63a of the sealing member 63 at the flange portion 64c of the portion extending to the left side of the left edge portion of the main surface 64a. Then, the adhesive layer formed on the lower surface of the right side sealing member 63a adheres to the upper surface of the flange portion 64c of the portion extending to the left side of the left edge portion of the main surface 64a.

A flow path connection space 60b surrounded by the lower surface of the support member 64 and the bottom wall portion 61 is formed between the lower surface of the support member 64 and the bottom wall portion 61. The flow path connection space 60b has a shape which bulges upward from the flange portion 64c of the support member 64 toward the main surface 64a. As described above, since the support member 64 is provided such that the right side sealing member 63a of the sealing member 63 is disposed on the upper surface of the flange portion 64c of the portion extending to the left side of the left edge portion of the main surface 64a, the flow path connection space 60b is continuous with the flow paths 60a formed between the lower surfaces of the battery modules 30 and the bottom wall portion 61 of the base plate 60. Accordingly, the support member 64 is provided such that the flow path connection space 60b surrounded by the lower surface of the support member 64 and the bottom wall portion 61 is continuous with the flow paths 60a formed between the lower surfaces of the battery modules 30 and the bottom wall portion 61 of the base plate 60. Since the adhesive layer formed on the lower surface of the right side sealing member 63a adheres to the upper surface of the flange portion 64c of the portion extending to the left side of the left edge portion of the main surface 64a, the gas flowing through the flow path connection space 60b flows to the flow paths 60a without leaking.

A front frame 81 is connected to the base plate 60 and extends in the vehicle width direction to cover the front wall portion 62a of the base plate 60. A rear frame 82 is connected to the base plate 60 and extends in the vehicle width direction to cover the rear wall portion 62b of the base plate 60. The front frame 81 is fixed to the floor panel 10 of the vehicle V, more specifically, to the kick-up portion 11a of the front floor panel 11 by a fastening member such as a bolt. The rear frame 82 is fixed to the floor panel 10 of the vehicle V, more specifically, to the front end portion of the rear floor panel 12 by a fastening member such as a bolt (see FIG. 2).

A protrusion 82a which protrudes forward is formed at a right end portion of the rear frame 82. The protrusion 82a has a flat plate shape which extends in a substantially horizontal direction from a right rear end portion toward the front of the rear frame 82. The protrusion 82a is provided with a substantially columnar male screw pin 82b which is inserted through the protrusion 82a in the upper-lower direction and protrudes upward. An outer peripheral surface of the male screw pin 82b is male-threaded.

(Fixing Battery Module)

As illustrated in FIGS. 3 to 5, 7, and 9, the base plate 60 includes a left battery module mounting portion 65 which protrudes to the right side from the left wall portion 62c. The left battery module mounting portion 65 is provided with a pair of front and rear male screw pins 65a which have a substantially columnar shape, are inserted in the upper-lower direction, and protrude upward. An outer peripheral surface of each male screw pin 65a is male-threaded. A left battery module bracket 71 is fixed to the left battery module mounting portion 65.

When viewed from the vehicle width direction, at a position overlapping left side surfaces of the two battery modules 30 arranged in the front-rear direction, the left battery module bracket 71 includes a main plate 71a which extends in the front-rear direction and the upper-lower direction, an upper end portion 71b which bends to the right direction from an upper end of the main plate 71a, extends in the front-rear direction and to the right direction from the upper end of the main plate 71a, and faces the left end portions of the upper surfaces of the two battery modules 30 arranged in the front-rear direction, and a lower end portion 71c which bends to the left direction from a lower end of the main plate 71a, extends in the front-rear direction and to the left direction from the lower end of the main plate 71a, and faces the left battery module mounting portion 65.

At positions overlapping the pair of front and rear male screw pins 65a provided on the left battery module mounting portion 65, the lower end portion 71c of the left battery module bracket 71 is formed with a pair of front and rear insertion holes through which the male screw pins 65a are respectively inserted. In the left battery module bracket 71, the pair of front and rear male screw pins 65a of the left battery module mounting portion 65 are inserted into the pair of front and rear insertion holes formed in the lower end portion 71c, and a fastening member such as a nut is fastened to each of the male screw pins 65a from above, so that the lower end portion 71c is fixed to the left battery module mounting portion 65. In this way, the left battery module bracket 71 has the lower end portion 71c fixed to the left battery module mounting portion 65, and extends in the upper-lower direction.

Two substantially cylindrical male screw pins 30a which project to the left side are provided in the front-rear direction on the left side surfaces of the two battery modules 30 arranged in the front-rear direction. At positions overlapping the male screw pins 30a which protrude to the left from the left side surfaces of the two battery modules 30, the main plate 71a of the left battery module bracket 71 is formed with the insertion holes through which the male screw pins 30a are respectively inserted. The male screw pins 30a provided on the left side surfaces of the two battery modules 30 are inserted into the insertion holes formed in the main plate 71a of the left battery module bracket 71, and the fastening member such as a nut is fastened to each of the male screw pins 30a from the left, so that the left battery module bracket 71 supports, from the left side, the left side surfaces of the two battery modules 30 arranged in the front-rear direction.

The main surface 64a of the support member 64 is provided with a pair of front and rear male screw pins 64d which have a substantially columnar shape, are inserted through the main surface 64a in the upper-lower direction, and protrude upward. An outer peripheral surface of each male screw pin 64d is male-threaded.

A right battery module bracket 72 is fixed to the support member 64. When viewed from the vehicle width direction, at a position overlapping right side surfaces of the two battery modules 30 arranged in the front-rear direction, the right battery module bracket 72 includes a main plate 72a which extends in the front-rear direction and the upper-lower direction, an upper end portion 72b which bends to the left direction from an upper end of the main plate 72a, extends in the front-rear direction and to the left direction from an upper end of the main plate 72a, and faces the right end portions of the upper surfaces of the two battery modules 30 arranged in the front-rear direction, and a lower end portion 72c which bends to the left direction from a lower end of the main plate 72a, extends in the front-rear direction and to the left direction from the lower end of the main plate 72a, and faces the main surface 64a of the support member 64.

At positions overlapping the pair of front and rear male screw pins 64d provided on the main surface 64a of the support member 64, the lower end portion 72c of the right battery module bracket 72 is formed with a pair of front and rear insertion holes through which the male screw pins 64d are inserted. In the right battery module bracket 72, the pair of front and rear male screw pins 64d provided on the main surface 64a of the support member 64 are respectively inserted into the pair of front and rear insertion holes formed in the lower end portion 72c, and a fastening member 64e such as a nut is fastened to each of the male screw pins 64d from above, so that the lower end portion 72c is fixed to the main surface 64a of the support member 64. In this way, the right battery module bracket 72 has the lower end portion 72c fixed to the support member 64, and extends in the upper-lower direction. In the present embodiment, the fastening member 64e is a nut which can be screwed into the male screw pin 64d.

Two substantially columnar male screw pins 30b which protrudes to the right are provided in the front-rear direction on the right side surfaces of the two battery modules 30 arranged in the front-rear direction. At positions overlapping the male screw pins 30b which protrudes to the right from the right side surfaces of the two battery modules 30, the main plate 72a of the right battery module bracket 72 is formed with insertion holes through which the male screw pins 30b are respectively inserted. The male screw pins 30b provided on the right side surfaces of the two battery modules 30 are respectively inserted into the insertion holes formed in the main plate 72a of the right battery module bracket 72, and a fastening member such as a nut is fastened to each of the male screw pins 30b from the right, so that the right battery module bracket 72 supports the right side surfaces of the two battery modules 30 arranged in the front-rear direction from the right.

(Fixing Cooling Device)

As illustrated in FIGS. 4 and 5, the base plate 60 includes a first fan mounting portion 66 which protrudes to the left from the right wall portion 62d. A first fan mounting portion 66 is provided with a pair of front and rear male screw pins 66a which have a substantially columnar shape, are inserted in the upper-lower direction, and protrude upward. An outer peripheral surface of each male screw pin 66a is male-threaded.

The base plate 60 includes a second fan mounting portion 67 which protrudes forward from the rear wall portion 62b between the first fan mounting portion 66 and the support member 64 in the vehicle width direction. The second fan mounting portion 67 is provided with one substantially columnar male screw pin 67a which is inserted in the upper-lower direction and protrudes upward in the present embodiment. An outer peripheral surface of the male screw pin 67a is male-threaded.

The substantially cylindrical fan case 41b extending in the upper-lower direction is provided with lug portions 41e which protrude outward in a radial direction. In the present embodiment, the lug portions 41e are provided at a right front region of the fan case 41b, a right rear region of the fan case 41b, and a left rear region of the fan case 41b. Therefore, in the present embodiment, the fan case 41b is provided with a total of three lug portions 41e. Each of the lug portions 41e is formed with an insertion hole which is penetrated in the upper-lower direction. The pair of front and rear male screw pins 66a provided on the first fan mounting portion 66 are inserted into the insertion holes from in the lug portions 41e provided at the right front region of the fan case 41b and the right rear region of the fan case 41b, the male screw pin 67a provided on the second fan mounting portion 67 is inserted into the insertion hole formed in the lug portion 41e provided in the left rear region of the fan case 41b, and the male screw pins 66a and the male screw pin 67a are fastened with fastening members such as nuts from above, so that the fan case 41b is fixed to the first fan mounting portion 66 and the second fan mounting portion 67 of the base plate 60. In this way, the fan 41 is fixed to the base plate 60.

Figure 6A:
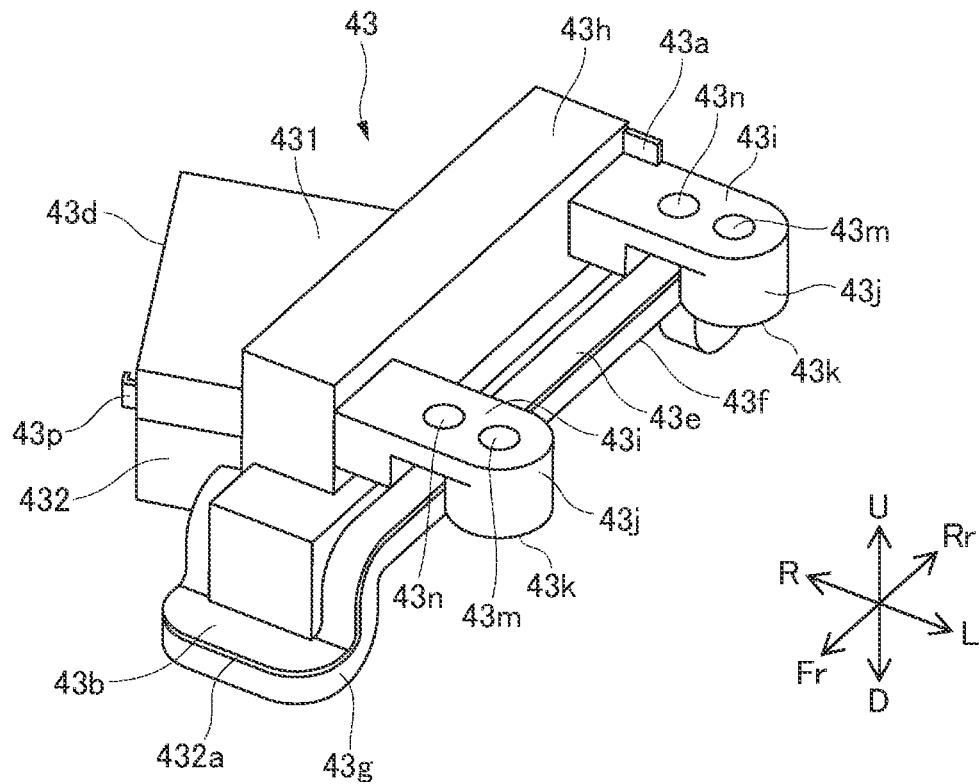
FIG. 6A is a perspective view of a delivery duct of FIG. 3 as viewed from a left front upper side.
Figure 6B:
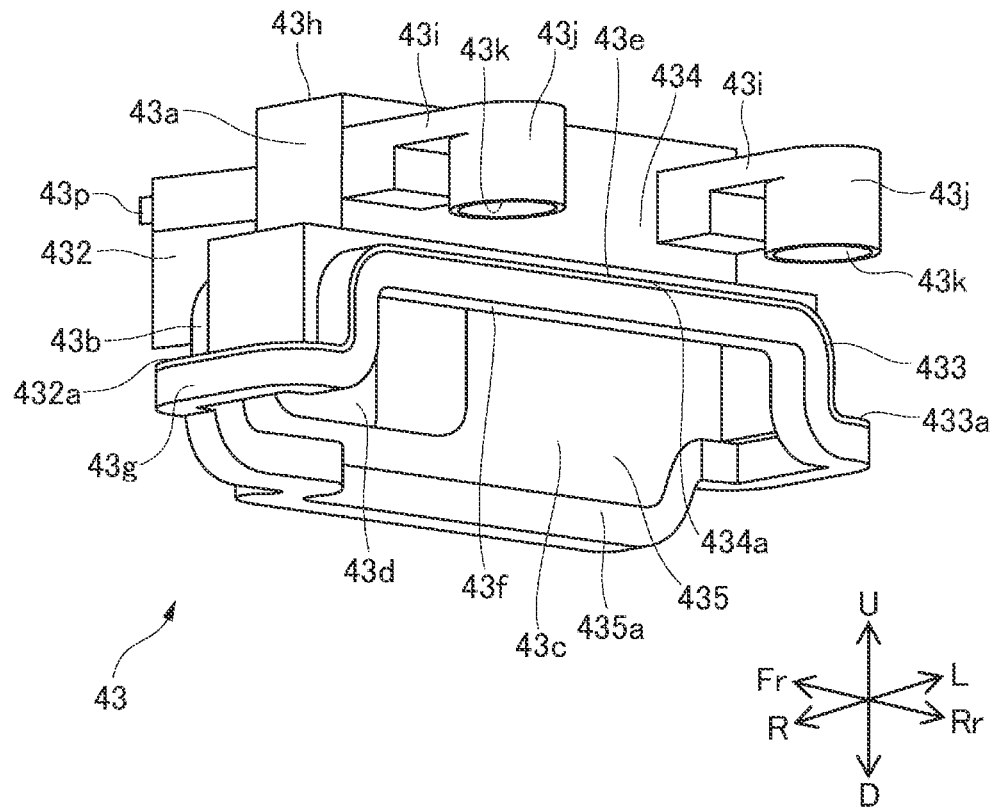
FIG. 6B is a perspective view of the delivery duct of FIG. 3 as viewed from a left front lower side.

As illustrated in FIGS. 6A and 6B, the delivery duct 43 has an upper surface 431, a front surface 432, a rear surface 433, a left surface 434, and a right surface 435. A lower part of the delivery duct 43 opens.

The delivery duct 43 includes an upper member 43a and a lower member 43b. The upper member 43a forms the upper surface 431, an upper region of the front surface 432, an upper region of the rear surface 433, an upper region of the left surface 434, and an upper region of the right surface 435 of the delivery duct 43. The lower member 43b forms a lower region of the front surface 432, a lower region of the rear surface 433, a lower region of the left surface 434, and a lower region of the right surface 435 of the delivery duct 43. The delivery duct 43 is formed by connecting the upper member 43a and the lower member 43b. In the present embodiment, a plurality of locking claws protruding upward are provided at an upper end of the lower member 43b, and the upper member 43a and the lower member 43b are connected by locking the locking claws to the upper member 43a.

The delivery duct 43 is formed with a duct portion 43c surrounded by the upper member 43a and the lower member 43b.

The left surface 434 of the delivery duct 43 is formed with an introduction port 43d which protrudes at the diagonally forward left side in a rectangular cylindrical shape to communicate with the duct portion 43c, has an opened protrusion end portion, and connects to the outlet 41d formed in the fan case 41b of the fan 41. Accordingly, the cooling gas blown from the outlet 41d of the fan 41 is introduced into the duct portion 43c through the introduction port 43d.

A lower edge portion 432a of the front surface 432, a lower edge portion 433a of the rear surface 433, and a lower edge portion 435a of the right surface 435 of the delivery duct 43 have a shape which follows a shape of the bottom wall portion 61 of the base plate 60. A lower edge portion 434a of the left surface 434 of the delivery duct 43 includes a curved portion 43e which is curved upward from the bottom wall portion 61. The curved portion 43e has a shape along an upper surface of the support member 64.

The delivery duct 43 has an opening 43f whose outer edge includes the lower edge portion 432a of the front surface 432, the lower edge portion 433a of the rear surface 433, the lower edge portion 434a of the left surface 434 including the curved portion 43e, and the lower edge portion 435a of the right surface 435. Therefore, the opening 43f opens downward and to the left.

A sealing member 43g is provided over an entire circumference of the front, back, left, and right of the outer edge of the opening 43f, that is, the lower edge portion 432a of the front surface 432, the lower edge portion 433a of the rear surface 433, the lower edge portion 434a of the left surface 434 including the curved portion 43e, and the lower edge portion 435a of the right surface 435. The sealing member 43g is formed of an elastic material such as rubber.

The upper surface 431 of the delivery duct 43 is provided with a pedestal portion 43h with which a lower surface of the introduction duct 42 is in contact. The pedestal portion 43h is provided at a left end portion of the upper member 43a so as to extend in the front-rear direction. The upper member 43a is provided with a pair of front and rear protrusions 43i which protrude to the left from the pedestal portion 43h.

A tip portion of each protrusion 43i is provided with a first engaging portion 43j which engages with the male screw pin 64d provided on the main surface 64a of the support member 64 and the fastening member 64e fastened to the male screw pin 64d. The first engaging portion 43j has a large diameter portion 43k which protrudes in a hollow cylindrical shape from a lower surface of the tip portion of the protrusion 43i and has an opened lower end. The large diameter portion 43k has a hollow cylindrical shape to which the male screw pin 64d provided on the main surface 64a of the support member 64 and the fastening member 64e fastened to the male screw pin 64d can be engaged.

The first engaging portion 43j further includes a small diameter portion 43m which has the same center as the large diameter portion 43k, and penetrates at the tip portion of the protrusion 43i in the upper-lower direction. The small diameter portion 43m has a hole shape through which the male screw pin 64d provided on the main surface 64a of the support member 64 can be inserted and the fastening member 64e fastened to the male screw pin 64d cannot be inserted.

Further, each protrusion 43i is provided with a second engaging portion 43n to which the positioning pin 42d provided at the left end portion of the introduction duct 42 engages. In the present embodiment, the second engaging portion 43n is provided on a right side of the first engaging portion 43j of the protrusion 43i. The second engaging portion 43n is a through hole which penetrates the protrusion 43i in the upper-lower direction and through which the positioning pin 42d of the introduction duct 42 can be inserted.

The delivery duct 43 is provided with a locking claw 43p which locks to the outlet 41d of the fan case 41b. In the present embodiment, the locking claw 43p is provided at the upper member 43a.

As illustrated in FIGS. 4 to 9, the locking claw 43p of the delivery duct 43 locks to the outlet 41d of the fan case 41b, so that the delivery duct 43 is connected to the fan 41, and the introduction port 43d of the delivery duct 43 is connected to the outlet 41d formed in the fan case 41b.

The lower edge portion 432a of the front surface 432, the lower edge portion 433a of the rear surface 433, and the lower edge portion 435a of the right surface 435 of the delivery duct 43 are in contact with the bottom wall portion 61 of the base plate 60 via the sealing member 43g. The lower edge portion 434a of the left surface 434 including the curved portion 43e of the delivery duct 43 is in contact with the upper surface of the support member 64 via the sealing member 43g. Therefore, the opening 43f opens downward and toward the flow path connection space 60b surrounded by the lower surface of the support member 64 and the bottom wall portion 61. The opening 43f of the delivery duct 43 is sealed by the bottom wall portion 61 of the base plate 60 and the upper surface of the support member 64 of the base plate 60 via the sealing member 43g.

In this case, the first engaging portion 43j of the delivery duct 43 engages with the male screw pin 64d provided on the upper surface of the support member 64 and the fastening member 64e fastened to the male screw pin 64d. Accordingly, the male screw pin 64d provided on the upper surface of the support member 64 and the fastening member 64e fastened to the male screw pin 64d also function as an engaged portion engaged with the first engaging portion 43j of the delivery duct 43.

Accordingly, when the delivery duct 43 is attached to the base plate 60, the first engaging portion of the delivery duct 43 is engaged with the base plate 60, so that the delivery duct 43 can be easily positioned with respect to the base plate 60, and an assemblability of the battery unit 20 is improved.

Further, the male screw pin 64d and the fastening member 64e fastened to the male screw pin 64d, which function as the engaged portion engaged with the first engaging portion 43j of the delivery duct 43, are provided on the upper surface of the support member 64. Accordingly, the delivery duct 43 can be attached to the base plate 60 from above, and when the delivery duct 43 is attached to the base plate 60 from above, a position of the engaged portion engaged with the first engaging portion 43j of the delivery duct 43 can be easily confirmed, and thus the assemblability of the battery unit 20 is further improved.

In the fan 41 and the delivery duct 43 attached to the base plate 60, the cooling gas blown from the outlet 41d of the fan 41 and introduced into the duct portion 43c through the introduction port 43d is delivered through the opening 43f of the delivery duct 43 to the flow path connection space 60b surrounded by the lower surface of the support member 64 and the bottom wall portion 61. Accordingly, the delivery duct 43 delivers, to the flow path connection space 60b surrounded by the lower surface of the support member 64 and the bottom wall portion 61, the cooling gas blown from the outlet 41d of the fan 41 and introduced into the duct portion 43c through the introduction port 43d. Then, the cooling gas delivered from the delivery duct 43 is delivered to the flow paths 60a continuous with the flow path connection space 60b through the flow path connection space 60b. In this way, the cooling device 40 delivers the cooling gas to the flow paths 60a.

In this case, the fan 41 is fixed to the base plate 60 on which the battery modules 30 are mounted, and thus the fan 41 can be positioned with respect to the battery modules 30 and fixed to the base plate 60. Accordingly, the fan 41 can be positioned and fixed with respect to the battery modules 30 without using a bracket or the like for fixing the fan 41, and the assemblability of the battery unit 20 is improved. Since the fan 41 is fixed to the base plate 60, the fan 41 can be disposed in the vicinity of the flow paths 60a formed between the lower surfaces of the battery modules 30 and the base plate 60. Accordingly, a distance from the fan 41 to the flow paths 60a can be shortened, so that the battery unit 20 can be miniaturized.

Since the opening 43f of the delivery duct 43 is sealed by the bottom wall portion 61 of the base plate 60 and the upper surface of the support member 64 of the base plate 60 via the sealing member 43g, the opening 43f of the delivery duct 43 can be sealed only by mounting the delivery duct 43 from above so as to be in contact with the upper surface of the support member 64 of the base plate 60 and the bottom wall portion 61 of the base plate 60, and the battery unit 20 can be easily assembled.

The introduction duct 42 is mounted on an upper surface of the fan 41 and the pedestal portion 43h of the delivery duct 43 by inserting the pair of front and rear positioning pins 42d provided at the left end portion of the introduction duct 42 through the second engaging portions 43n provided on the pair of front and rear protrusions 43i of the delivery duct 43. Further, the introduction duct 42 is mounted on the upper surface of the fan 41 and the pedestal portion 43h of the delivery duct 43 by fitting the discharge port 42c to the aspiration port 41c of the fan case 41b.

In this case, since the aspiration port 41c of the fan 41 opens upward and the introduction duct 42 is disposed above the fan 41, the introduction duct 42 is easily assembled to the battery unit 20 such that the discharge port 42c of the introduction duct 42 and the aspiration port 41c of the fan case 41b are fitted to each other.

When the introduction duct 42 is attached to the upper surface of the fan 41 and the pedestal portion 43h of the delivery duct 43, the pair of front and rear positioning pins 42d provided at the left end portion of the introduction duct 42 are inserted through the second engaging portions 43n provided on the pair of front and rear protrusions 43i of the delivery duct 43, so that the introduction duct 42 can be easily positioned with respect to the delivery duct 43, and thus the assemblability of the battery unit 20 is improved.

Further, since the second engaging portions 43n of the delivery duct 43 are provided on the upper surface 431 of the delivery duct 43, the introduction duct 42 can be attached to the upper surface of the fan 41 and the pedestal portion 43h of the delivery duct 43 from above, and when the introduction duct 42 is attached to the upper surface of the fan 41 and the pedestal portion 43h of the delivery duct 43 from above, positions of the second engaging portions 43n of the delivery duct 43 can be easily confirmed, and thus the assemblability of the battery unit 20 is further improved.

The battery unit 20 further includes a junction board bracket 73 which extends above the introduction duct 42 and supports the junction board 52. Therefore, the introduction duct 42 is disposed between the fan 41 and the junction board bracket 73. The junction board bracket 73 includes a main plate 730 which extends in the front-rear direction and the vehicle width direction at a position overlapping the introduction duct 42 when viewed from the upper-lower direction.

A left center fixing portion 730a is provided at a position substantially in a center in a front-rear direction of a left end portion of the main plate 730. A through hole which is penetrated in the upper-lower direction is formed in the left center fixing portion 730a.

The junction board bracket 73 further includes a first extending portion 731 which bends downward from a right front end portion of the main plate 730 and extends downward from the main plate 730. A lower end portion 731a of the first extending portion 731 bends in a front right direction and extends in a substantially horizontal direction. A right front fixing portion 731b is provided at the lower end portion 731a of the first extending portion 731. The right front fixing portion 731b is formed with a through hole which is penetrated in the upper-lower direction and can be inserted through by the front male screw pin 66a of the pair of front and rear male screw pins 66a provided on the first fan mounting portion 66 of the base plate 60.

The junction board bracket 73 further includes a second extending portion 732 which protrudes to the right from a right rear end portion of the main plate 730 and extends substantially in the horizontal direction. A right rear fixing portion 732b is provided at a right end portion 732a of the second extending portion 732. The right rear fixing portion 732b is formed with a through hole which is penetrated in the upper-lower direction and can be inserted through by the male screw pin 82b provided on the protrusion 82a formed on the right end portion of the rear frame 82 described above.

The main plate 72a of the right battery module bracket 72 is provided with a flat plate-shaped extending portion 72d which extends to the right direction from the main plate 72a and extends in the front-rear direction and the vehicle width direction. The extending portion 72d is provided with an insertion hole 72e which is penetrated in the upper-lower direction, and a nut member 72f is fixed to a lower surface of the extending portion 72d at a position overlapping the insertion hole when viewed from the upper-lower direction.

A bolt 73a is inserted from above into the through hole which is formed in the left center fixing portion 730a and is penetrated in the upper-lower direction. The bolt 73a is fastened to the nut member 72f by being inserted through the insertion hole 72e provided in the extending portion 72d of the right battery module bracket 72. Accordingly, the left center fixing portion 730a is fixed to the right battery module bracket 72.

In the pair of front and rear male screw pins 66a provided on the first fan mounting portion 66 of the base plate 60, the front male screw pin 66a penetrates the insertion hole formed in the lug portion 41e of the fan case 41b and protrudes above the lug portion 41e. Then, in the pair of front and rear male screw pins 66a provided on the first fan mounting portion 66 of the base plate 60, the front male screw pin 66a penetrates from a lower side into the through hole formed in the right front fixing portion 731b and penetrated in the upper-lower direction. Then, a fastening member such as a nut is fastened from above to the front male screw pin 66a of the pair of front and rear male screw pins 66a provided on the first fan mounting portion 66 of the base plate 60, so that the right front fixing portion 731b is fastened together with the lug portion 41e of the fan case 41b, and is fixed to the first fan mounting portion 66 of the base plate 60 together with the fan 41.

The male screw pin 82*b* provided on the protrusion 82*a* formed at the right end portion of the rear frame 82 penetrates, from a lower side, the through hole formed in the right rear fixing portion 732*b* and penetrated in the upper-lower direction. Then, a fastening member such as a nut is fastened from above to the male screw pin 82*b* provided on the protrusion 82*a* formed at the right end portion of the rear frame 82, so that the right rear fixing portion 732*b* is fixed to the protrusion 82*a* formed at the right end portion of the rear frame 82.

Accordingly, the junction board bracket 73 includes the left center fixing portion 730*a* fixed to the right battery module bracket 72, the right front fixing portion 731*b* fixed to the base plate 60, and the right rear fixing portion 732*b* fixed to the rear frame 82. Therefore, the junction board bracket 73 is fixed to the right battery module bracket 72, the base plate 60, and the rear frame 82.

Therefore, the right battery module bracket 72 is fixed to the support member 64 of the base plate 60 at the lower end portion 72*c*, and is fixed to the first fan mounting portion 66 of the base plate 60 and the protrusion 82*a* of the rear frame 82 via the junction board bracket 73 at the extending portion 72*d*. Therefore, the right battery module bracket 72 is fixed to the base plate 60 at a plurality of locations including at least the lower end portion 72*c* and the extending portion 72*d*. Accordingly, the right battery module bracket 72 is firmly fixed by the base plate 60, and thus the battery modules 30 supported by the right battery module bracket 72 can be prevented from vibrating in the battery unit 20.

The junction board bracket 73 is fixed to the right battery module bracket 72, the base plate 60, and the rear frame 82 such that the main plate 730 is in contact with the introduction duct 42 and the main plate 730 pushes the introduction duct 42 downwards. In this way, the junction board bracket 73 urges the introduction duct 42 toward the aspiration port 41*c* of the fan 41.

Accordingly, the introduction duct 42 can be attached to the fan 41 while maintaining high sealing performance between the discharge port 42*c* of the introduction duct 42 and the aspiration port 41*c* of the fan 41 without using an additional component such as a fastening member. Thus, the assemblability of the battery unit 20 is improved.

(Fixing Junction Board)

Figure 8:
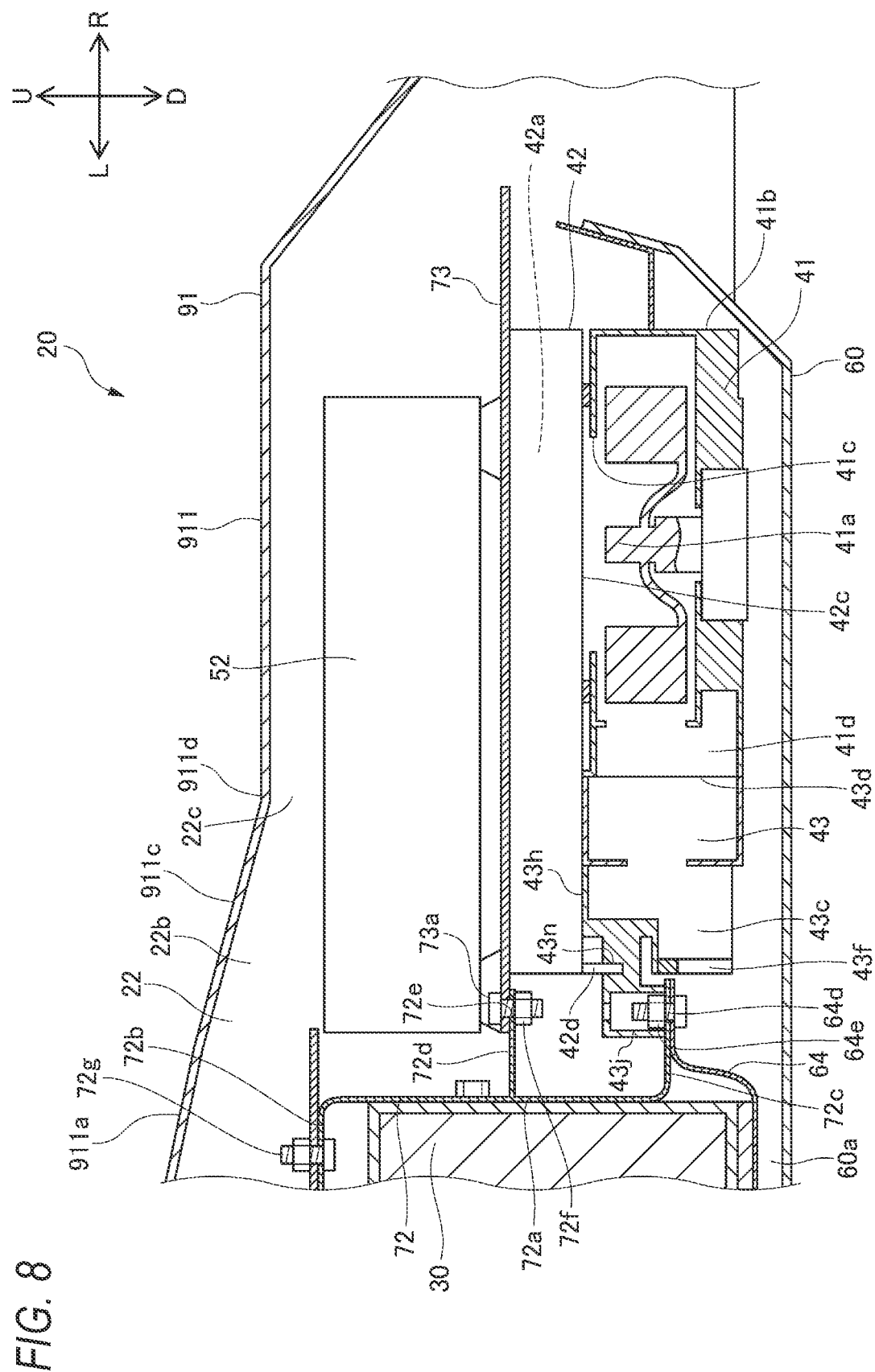
FIG. 8 is an enlarged view of a main part illustrating a vicinity of a cooling device, a junction board bracket, a junction board, and a base plate of FIG. 7 in an enlarged manner.
Figure 10:
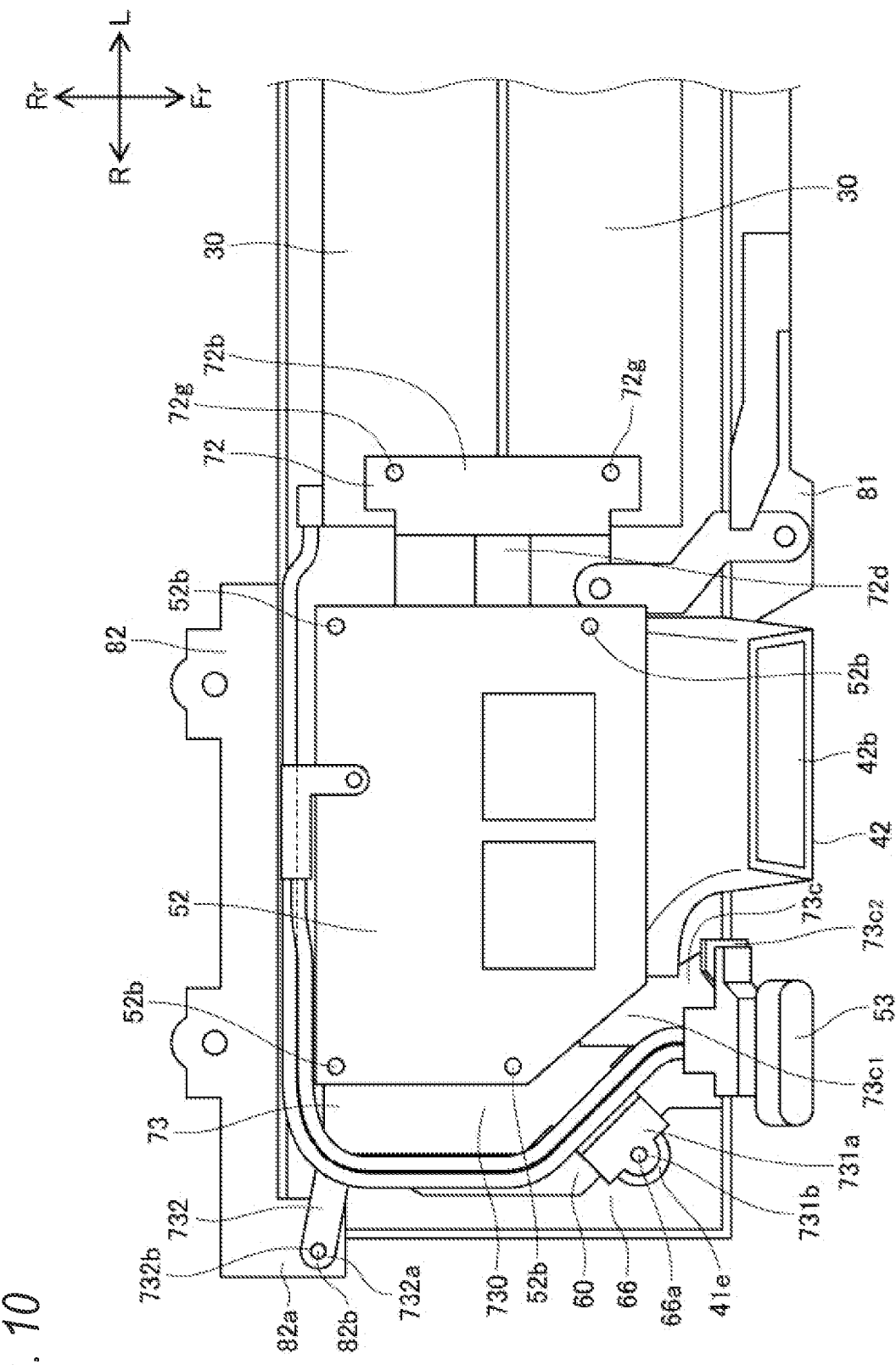
FIG. 10 is an enlarged view of a main part in a vicinity of a junction board when the battery unit of FIG. 3 as viewed from above with a battery unit cover, a battery control device, and a battery control device bracket removed.

As illustrated in FIGS. 4, 8, and 10, the junction board 52 is disposed above the junction board bracket 73, is mounted on an upper surface of the junction board bracket 73, and is supported by the junction board bracket 73.

The junction board 52 is formed with insertion holes 52*b* which are penetrated in the upper-lower direction at four locations of a left front end portion, a left rear end portion, a right front end portion, and a right rear end portion.

The main plate 730 of the junction board bracket 73 is formed with insertion holes 73*b* which are penetrated in the upper-lower direction at positions overlapping the insertion holes 52*b* formed in the junction board 52 when viewed from the upper-lower direction. A nut is fixed to a lower surface of the main plate 730 at a position overlapping each insertion hole 73*b* when viewed from the upper-lower direction.

Bolts are inserted from above into the insertion holes 52*b* at the left front end portion, the left rear end portion, the right front end portion, and the right rear end portion of the junction board 52. The bolts to be inserted into the insertion holes 52*b* of the junction board 52 from above penetrate the insertion holes 52*b* of the junction board 52 and the insertion holes 73*b*, formed at the positions overlapping the insertion holes 52*b*, of the junction board bracket 73, and is fastened to the nuts fixed at the position overlapping the insertion holes 73*b*. Accordingly, the junction board 52 is disposed above the junction board bracket 73 and is supported by the upper surface of the junction board bracket 73.

In this way, the junction board 52 is disposed above the cooling device 40 at the position where at least the part of the junction board 52 overlaps the cooling device 40 when viewed from the upper-lower direction. The introduction duct 42 of the cooling device 40 is disposed between the junction board 52 and the fan 41 in the upper-lower direction.

(Assembling Cooling Device and Junction Board to Battery Unit)

As illustrated in FIGS. 4 to 10, when assembling the battery unit 20, first, the locking claw 43*p* of the delivery duct 43 is locked to the outlet 41*d* of the fan case 41*b* to connect the delivery duct 43 and the fan 41, the pair of front and rear male screw pins 66*a* provided on the first fan mounting portion 66 are inserted into the insertion holes formed in the lug portions 41*e* provided at the right front region of the fan case 41*b* and the right rear region of the fan case 41*b*, the male screw pin 67*a* provided at the second fan mounting portion 67 is inserted into the insertion hole formed in the lug portion 41*e* provided at the left rear region of the fan case 41*b*, and the first engaging portions 43*j* of the delivery duct engage with the male screw pins 64*d* provided on the upper surface of the support member 64 and with the fastening members 64*e* fastened to the male screw pins 64*d*, so that the fan 41 and the delivery duct 43 are mounted on the base plate 60. Then, a fastening member such as a nut is fastened from above to the rear male screw pin 66*a* and the rear male screw pin 67*a* provided in the first fan mounting portion 66.

Next, the discharge port 42*c* of the introduction duct 42 is fitted to the aspiration port 41*c* of the fan 41, and the pair of front and rear positioning pins 42*d* of the introduction duct 42 engage with the second engaging portions 43*n* of the delivery duct 43, so that the introduction duct 42 is mounted on the upper surface of the fan 41 and the pedestal portion 43*h* of the delivery duct 43.

Next, the front male screw pin 66*a* provided on the first fan mounting portion 66 of the base plate 60 penetrates the through hole formed in the right front fixing portion 731*b*, and the male screw pin 82*b* provided on the protrusion 82*a* of the rear frame 82 penetrates the through hole formed in the right rear fixing portion 732*b*, so that the junction board bracket 73 is mounted on the upper surface of the introduction duct 42. Then, fastening members such as nuts are fastened from above to the front male screw pin 66*a* provided on the first fan mounting portion 66 of the base plate 60 and the male screw pin 82*b* provided on the protrusion 82*a* of the rear frame 82, and the bolt 73*a* is inserted from above into the through hole formed in the left center fixing portion 730*a* and fastened to the nut member 72*f* provided on the extending portion 72*d* of the right battery module bracket 72.

Next, the junction board 52 is mounted on the upper surface of the junction board bracket 73. Then, the bolts are inserted from above into the insertion holes 52*b* of the junction board 52 and the insertion holes 73*b*, formed at the positions overlapping the insertion holes 52*b*, of the junction board bracket 73, and are fastened to the nuts fixed at the positions overlapping the insertion hole 73*b*.

Accordingly, the fan 41, the delivery duct 43, the introduction duct 42, the junction board bracket 73, and the junction board 52 can be assembled to the battery unit 20. Therefore, the fan 41, the delivery duct 43, the introduction duct 42, the junction board bracket 73, and the junction board 52 can be mounted in this order and assembled to the battery unit 20 from above, and thus the assemblability of the battery unit 20 is further improved.

(Fixing Service Plug)

Figure 9:
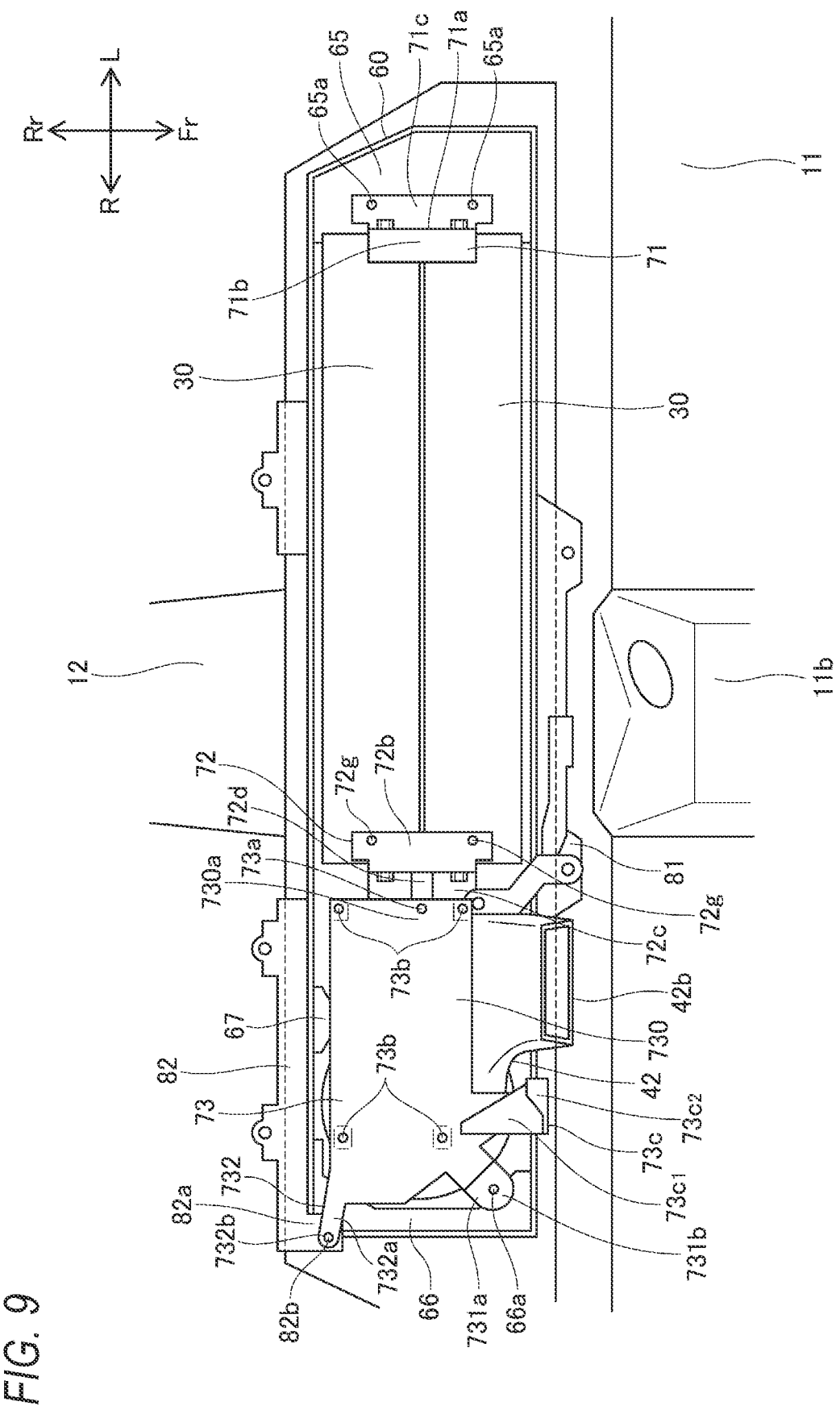
FIG. 9 is a view of the battery unit of FIG. 3 as viewed from above with a battery unit cover, a battery control device, a battery control device bracket, a junction board, and a service plug removed.

As illustrated in FIGS. 4, 9, and 10, the junction board bracket 73 includes a stay 73c which supports the service plug 53. The stay 73c is provided at the right front end portion of the main plate 730, and at a position where the first extending portion 731 is adjacent to a right side of the stay 73c and the introduction port 42b of the introduction duct 42 is adjacent to a left side of the stay 73c. The stay 73c includes a fixing portion 73c1 which extends so as to face an upper surface of the main plate 730, and a service plug support portion 73c2 which is bent from a front end portion of the fixing portion 73c1 and is inclined rearward from the front end of the fixing portion 73c1 and extends upward. A front surface of the service plug support portion 73c2 faces diagonally upward and forward. The stay 73c is fixed to the main plate 730 such that in the front-rear direction, the front end portion of the fixing portion 73c1 is located at substantially the same position as the front end portion of the main plate 730 or in front of the front end portion of the main plate 730. In the stay 73c, a lower surface of the fixing portion 73c1 is fixed to the upper surface of the main plate 730. The stay 73c is fixed to the main plate 730 by joining the lower surface of the fixing portion 73c1 and the upper surface of the main plate 730 by, for example, welding or the like.

The service plug 53 is supported on the front surface of the service plug support portion 73c2 facing diagonally upward and forward. In the present embodiment, the service plug 53 is provided adjacent to a right side of the introduction port 42b of the introduction duct 42. Therefore, both the junction board 52 and the service plug 53 are supported by the junction board bracket 73, and thus, the wiring member which electrically connects the external device (not illustrated) and the junction board 52 can be prevented from bending between the junction board 52 and the service plug 53 due to vibration of the junction board bracket 73. In addition, since the junction board 52 and the service plug 53 are both supported by the junction board bracket 73, the service plug 53 can be easily assembled to the battery unit 20.

(Fixing Battery Control Device)

Figure 7:
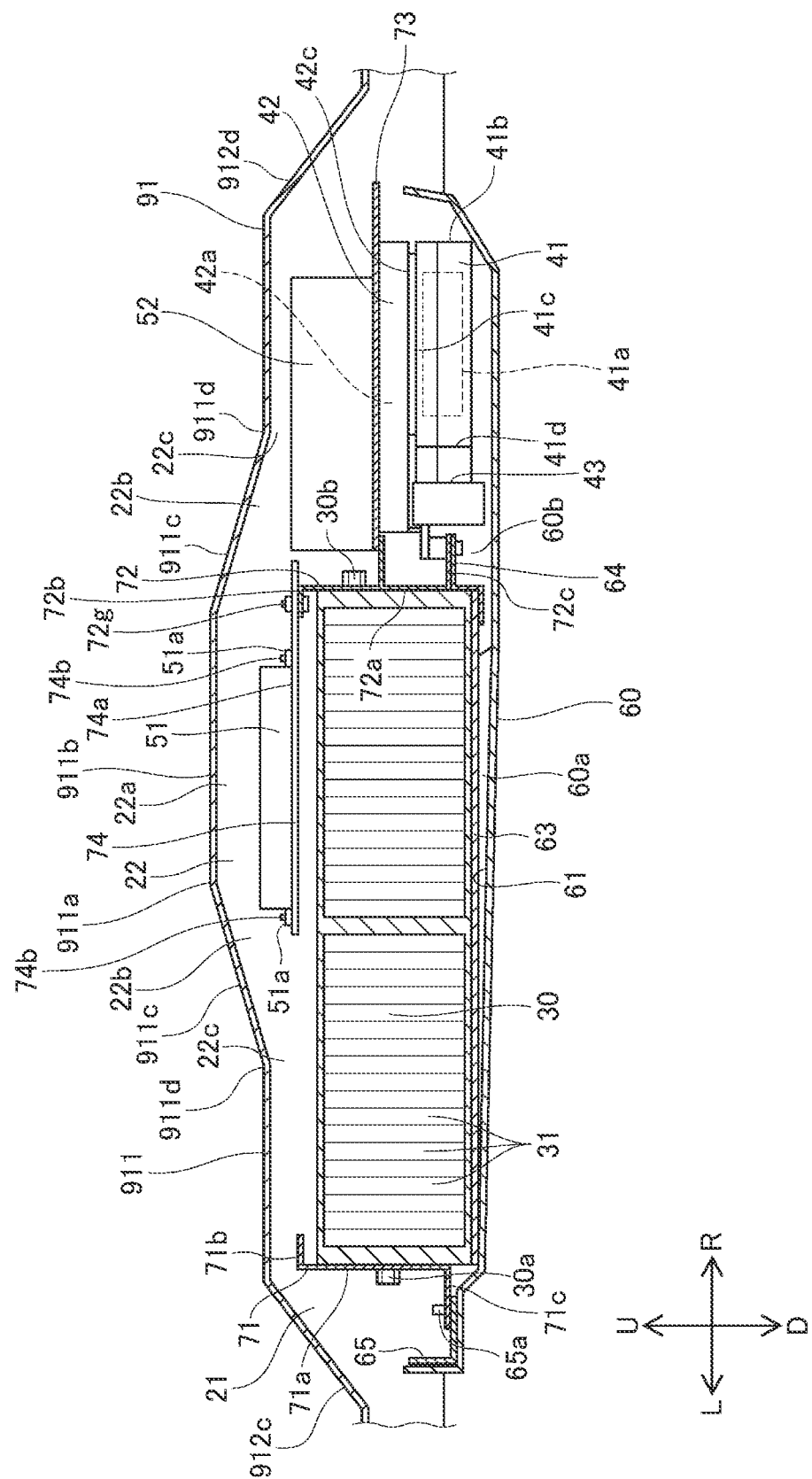
FIG. 7 is a cross-sectional view of a main part of the battery unit of FIG. 3 as viewed from a rear side.

As illustrated in FIGS. 2, 3, and 7, the battery unit 20 further includes the battery control device bracket 74 which supports the battery control device 51. The battery control device bracket 74 has a main plate 74a extending in the upper-lower direction and the vehicle width direction.

The upper end portion 72b of the right battery module bracket 72 is provided with a pair of front and rear male screw pins 72g which penetrate the upper end portion 72b in the upper-lower direction, protrude upward, and have a substantially columnar shape. An outer peripheral surface of each male screw pin 72g is male-threaded.

A right end portion of the main plate 74a is formed with a pair of front and rear insertion holes which are penetrated in the upper-lower direction and can be inserted through by the male screw pins 72g. The pair of front and rear male screw pins 72g provided on the upper end portion 72b of the right battery module bracket 72 are inserted into the pair of front and rear insertion holes formed in the right end portion of the main plate 74a, and a fastening member such as a nut is fastened to each male screw pin 72g from above, so that the battery control device bracket 74 is fixed to the upper end portion 72b of the right battery module bracket 72. Therefore, the main plate 74a of the battery control device bracket 74 extends from the upper end portion 72b of the right battery module bracket 72 toward the left in the front-rear direction and the vehicle width direction. Further, the main plate 74a of the battery control device bracket 74 faces the upper surfaces of the two battery modules 30, and extends in the front-rear direction and the vehicle width direction at a position overlapping the two battery modules 30 arranged in the front-rear direction when viewed from the upper-lower direction.

The battery control device 51 has a substantially rectangular parallelepiped shape which is shortest in the upper-lower direction, and is provided with lug portions 51a extending toward an outside of the battery control device 51. The lug portions 51a are provided at a front end portion of a right side surface of the battery control device 51 and a rear end portion of a left side surface of the battery control device 51 so as to extend outward in the vehicle width direction. Each lug portion 51a is formed with an insertion hole which opens in the upper-lower direction.

When viewed from the upper-lower direction, at positions overlapping with the insertion holes formed in the lug portions 51a provided at a right front end portion and a left rear end portion of the battery control device 51, the main plate 74a of the battery control device bracket 74 is provided with substantially columnar male screw pins 74b which are inserted through the main plates 74a in the upper-lower direction and protrude upward. Then, the male screw pins 74b provided on the main plate 74a of the battery control device bracket 74 are respectively inserted into the insertion holes formed in the lug portions 51a provided at the right front end portion and the left rear end portion of the battery control device 51, and fastening members such as nuts are fastened to the male screw pins 74b from above, so that the battery control device 51 is fixed to the main plate 74a of the battery control device bracket 74.

(Battery Unit Cover)

As illustrated in FIGS. 1 to 3 and 7, the battery unit 20 further includes a battery unit cover 91 which straddles the center tunnel 11b of the floor panel 10 in the vehicle width direction and covers an upper side of the accommodation recessed portion 121. The battery unit cover 91 covers the two battery modules 30, the cooling device 40, the battery control device 51, the junction board 52, the service plug 53, the base plate 60, the front frame 81, and the rear frame 82 from above. The battery unit cover 91 is fixed to the floor panel 10. The battery unit cover 91 is made of a metal material and functions as a part of a body skeleton of the vehicle V. Therefore, the battery unit cover 91 fixed to the floor panel 10 improves a rigidity of the body skeleton of the vehicle V.

The battery unit cover 91 includes an upper wall portion 911 which extends in the front-rear direction and the vehicle width direction and faces upward, and a side wall portion 912 which surrounds front, rear, left, and right outer edge portions of the upper wall portion 911 and extends downward from the front, rear, left, and right outer edge portions of the upper wall portion 911. The side wall portion 912 includes: a front wall portion 912a which is bent from a front edge portion of the upper wall portion 911, is inclined diagonally forward and downward, and extends in the vehicle width direction; a rear wall portion 912b which bends from a rear edge portion of the upper wall portion 911, is inclined diagonally rearward and downward, and extends in the vehicle width direction; a left wall portion 912c which is bent from a left edge portion of the upper wall portion 911, is inclined diagonally downward to the left, and extends in the vehicle width direction; and a right wall portion 912d which bends from a right edge portion of the upper wall portion 911, inclines diagonally downward to the right, and extends in the vehicle width direction.

The battery unit 20 is mounted on the vehicle V such that the battery modules 30 are arranged to make a stacking direction of the battery cells 31 as the vehicle width direction, and such that the cooling device 40 and the junction board 52 are disposed on a right side of the battery module 30 in the vehicle width direction. Therefore, the battery unit 20 is mounted on the vehicle V such that a longitudinal direction extends in the vehicle width direction. The vehicle V is provided with the rear seat RS so as to cover the upper wall portion 911 of the battery unit cover 91. That is, the battery unit 20 is mounted under the rear seat RS of the vehicle V.

The battery unit 20 is formed with an accommodating space 21 surrounded by the battery unit cover 91 and the base plate 60. The accommodating space 21 accommodates the two battery modules 30, the cooling device 40, the battery control device 51, the junction board 52, and the service plug 53.

The front wall portion 912a of the battery unit cover 91 is formed with a first opening 91a hollowed out along a shape of the introduction port 42b of the introduction duct 42. Then, the cooling gas is introduced into the accommodating space 21 of the battery unit 20 through the first opening 91a of the battery unit cover 91. In this case, since the first opening 91a of the battery unit cover 91 has the shape hollowed out along the shape of the introduction port 42b of the introduction duct 42, the cooling gas introduced into the accommodating space 21 of the battery unit 20 through the first opening 91a of the battery unit cover 91 is introduced into the introduction port 42b of the introduction duct 42.

The front wall portion 912a of the battery unit cover 91 is provided with a second opening 91b on a right side of the first opening 91a. The battery unit 20 is capable of inserting and removing the service plug 53 by inserting a finger or an instrument into the accommodating space 21 of the battery unit 20 through the second opening 91b of the battery unit cover 91.

An intake duct 92 which takes in air in the vehicle cabin CB as the cooling gas for the battery unit 20 is attached to the front wall portion 912a of the battery unit cover 91. The intake duct 92 includes an intake port 92a which opens toward the vehicle cabin CB, a discharge port 92b which opens so as to surround the first opening 91a of the battery unit cover 91, and a duct portion 92c which communicates the intake port 92a and the discharge port 92b and is surrounded by a wall surface of the intake duct 92. The intake port 92a of the intake duct 92 is disposed substantially in the center of the vehicle width direction so as to straddle the center tunnel 11b in the vehicle width direction. The duct portion 92c of the intake duct 92 extends in the vehicle width direction from the intake port 92a provided substantially in the center in the vehicle width direction to the discharge port 92b provided at a position overlapping the first opening 91a of the battery unit cover 91. The intake duct 92 is attached such that an upper end portion of the intake port 92a is substantially at the same position as the upper wall portion 911 of the battery unit cover 91 in the upper-lower direction.

An intake grill 93 having a mesh shape, a grid shape, a honeycomb shape, or the like is attached to the intake duct 92 so as to cover the intake port 92a. A carpet 14 is laid on an upper surface of the front floor panel 11 which constitutes the floor portion of the vehicle cabin CB. The carpet 14 is hollowed out at a position overlapping the intake port 92a of the intake duct 92, and the intake grill 93 is attached to the intake duct 92 with the carpet 14 sandwiched between the intake grill 93 and the intake duct 92.

The front wall portion 912a of the battery unit cover 91 is formed with an exhaust port 91c which discharges the cooling gas flowing through the accommodating space of the battery unit 20 to the outside of the battery unit. The exhaust port 91c protrudes forward from the front wall portion 912a of the battery unit cover 91 to extend in the front-rear direction between the center tunnel 11b and the carpet 14 below the intake port 92a of the intake duct 92, and is formed so as to face an upper surface of the center tunnel 11b and substantially in the center of the vehicle width direction. Accordingly, the exhaust port 91c is provided on a front side of the battery unit 20. In the accommodating space of the battery unit 20, the battery modules 30 are arranged so as to be offset from the substantially center in the vehicle width direction to the left direction, and the cooling device 40 and the junction board 52 are disposed on the right sides of the battery modules 30, whereas the exhaust port 91c is formed substantially in the center in the vehicle width direction. Therefore, the exhaust port 91c is provided on a right side of the vehicle width direction center of the battery module 30 in the vehicle width direction, that is, closer to the junction board 52 than the vehicle width direction center of the battery module 30 in the vehicle width direction.

The exhaust port 91c communicates with the accommodating space 21 of the battery unit 20, and includes a wall portion 91d which extends in the front-rear direction from the front wall portion 912a of the battery unit cover 91 in a U-shape which opens downward when viewed from the front-rear direction. A left surface and a right surface of the wall portion 91d are in contact with a left surface and a right surface of the center tunnel 11b, respectively. The exhaust port 91c is surrounded by the upper surface of the center tunnel 11b and the wall portion 91d, and opens forward. Fixing portions 91e which are recessed downward and in contact with the upper surface of the center tunnel are formed at a left front end portion and a right front end portion of the upper surface of the wall portion 91d. The fixing portions 91e are respectively provided with through holes which are penetrated in the upper-lower direction, and the exhaust port 91c is fixed to the upper surface of the center tunnel 11b by fastening bolts which penetrate the through holes from above to the upper surface of the center tunnel 11b.

(Flow of Cooling Gas)

The battery unit 20 takes in the air in the vehicle cabin CB as the cooling gas of the battery unit 20 through the intake duct 92 and takes the cooling gas into the accommodating space 21 through the first opening 91a of the battery unit cover 91. The cooling gas taken into the accommodating space 21 from the first opening 91a of the battery unit cover 91 flows through the flow path 42a from the introduction port 42b of the introduction duct 42, and is aspirated into the aspiration port 41c of the fan 41 through the discharge port 42c. The cooling gas aspirated into the aspiration port 41c of the fan 41 is blown from the outlet 41d of the fan 41, and delivered from the delivery duct 43 through the flow path connection space 60b to the flow paths 60a continuous with the flow path connection space 60b. The cooling gas delivered to the flow paths 60a is introduced into the battery modules 30 from the lower surfaces of the battery modules 30, flows from the lower sides to the upper sides in the battery modules 30 to cool the battery modules 30, and is discharged from the upper surfaces of the battery modules 30.

In the accommodating space 21 of the battery unit 20, an exhaust space 22 surrounded by the battery unit cover 91 is formed above the battery modules 30. The upper surfaces of the battery modules 30 face the exhaust space 22. Therefore, the cooling gas discharged from the upper surfaces of the battery modules 30 after cooling the battery modules 30 is discharged to the exhaust space 22.

The exhaust space 22 extends in the vehicle width direction to an upper side of the junction board 52. An upper part of the junction board 52 faces the exhaust space 22. Therefore, since high-temperature air flows upward, the air whose temperature is raised by heat generated in the junction board 52 is discharged from the upper part of the junction board 52 to the exhaust space 22.

The cooling gas discharged to the exhaust space 22 is discharged from the exhaust port 91c provided on the front wall portion 912a of the battery unit cover 91 to an outside of the battery unit 20, more specifically, to a space between the center tunnel 11b and the carpet 14 of the vehicle cabin CB. Therefore, the exhaust port 91c provided on the front wall portion 912a of the battery unit cover 91 discharges the cooling gas discharged to the exhaust space 22 to the outside of the battery unit 20.

In this way, the upper part of the junction board 52 faces the exhaust space 22, so that the air whose temperature is raised by the heat generated in the junction board 52 is discharged to the exhaust space 22, and is discharged to the outside of the battery unit 20 through the exhaust port 91c together with the cooling gas which has cooled the battery modules 30. Accordingly, the air whose temperature is raised by the heat generated in the junction board 52 can be prevented from staying inside the battery unit 20, that is, in the accommodating space 21 of the battery unit 20, and a cooling performance of the battery unit 20 is improved.

Then, the air whose temperature is raised by the heat generated in the junction board 52 is prevented from staying inside the battery unit 20, that is, in the accommodating space 21 of the battery unit 20, so that even if the battery unit 20 is mounted under the rear seat RS, the heat generated by the battery unit 20 can be prevented from being transferred to the rear seat RS. Accordingly, the battery unit 20 can be mounted under the rear seat RS without impairing a commercial value of the rear seat RS, and the battery unit 20 can be efficiently provided in a space of the vehicle V.

Further, the exhaust port 91c is provided at the position closer to the junction board 52 than the vehicle width direction center of the battery module 30 in the vehicle width direction, and thus the air whose temperature is raised by the heat generated in the junction board 52 is more smoothly discharged to the outside of the battery unit 20 through the exhaust port 91c together with the cooling gas which has cooled the battery modules 30. Accordingly, the air whose temperature is raised by the heat generated in the junction board 52 can be further prevented from staying inside the battery unit 20, that is, in the accommodating space 21 of the battery unit 20, and the cooling performance of the battery unit 20 is further improved.

The junction board 52 is disposed above the cooling device 40 at the position where at least a part of the junction board 52 overlaps the cooling device 40 when viewed from the upper-lower direction, and the air whose temperature is raised by the heat generated in the junction board 52 flows upward, and thus the air whose temperature is raised by the heat generated in the junction board 52 can be prevented from being in contact with the cooling device 40. Therefore, the heat generated in the junction board 52 can be prevented from being transferred to the cooling device 40, and thus the cooling gas supplied from the cooling device 40 to the battery modules 30 can be prevented from rising in temperature due to the heat generated in the junction board 52. Accordingly, a lower-temperature cooling gas can be supplied to the battery modules 30, and the cooling performance of the battery unit 20 is improved.

The introduction duct 42 is disposed between the junction board 52 and the fan 41 in the upper-lower direction, and thus the junction board 52 is disposed above the introduction duct 42, and the fan 41 is disposed below the introduction duct 42. Therefore, even if the heat generated in the junction board 52 is transferred to the cooling device 40, since the introduction duct 42 is disposed between the junction board 52 and the fan 41 in the upper-lower direction, the heat generated in the junction board 52 can be prevented from being transferred to the fan 41. Further, since the fan 41 is disposed below the introduction duct 42, the cooling gas which flows through a lower part of the introduction duct 42 is aspirated into the fan 41. Therefore, even if the heat generated in the junction board 52 is transferred to the introduction duct 42, in the cooling gas which flows through the introduction duct 42, the cooling gas which flows through the lower part of the introduction duct 42 in which the heat generated in the junction board 52 is less likely to be transferred is aspirated into the fan 41. Accordingly, a low-temperature cooling gas can be supplied to the battery modules 30, and the cooling performance of the battery unit 20 is further improved.

The upper wall portion 911 of the battery unit cover 91 has a bulging portion 911a which bulges upward. The bulging portion 911a is formed at a position overlapping the exhaust port 91c and the center tunnel 11b in the vehicle width direction and at a substantially central portion of the battery unit 20 in the vehicle width direction. An uppermost portion of the bulging portion 911a is an uppermost portion 911b of the upper wall portion 911 of the battery unit cover 91. Therefore, the uppermost portion 22a of the exhaust space 22 is formed at a position overlapping the exhaust port 91c and the center tunnel 11b in the vehicle width direction and at the substantially central portion of the battery unit 20 in the vehicle width direction.

The higher the temperature of the gas, the higher the gas flows, and thus the higher the temperatures of the cooling gas whose temperature is raised by cooling the battery modules 30 and the air whose temperature is raised by the heat generated in the junction board 52, the more the cooling gas and the air flow toward the vicinity of the uppermost portion 22a of the exhaust space 22. Since the uppermost portion 22a of the exhaust space 22 is formed at the position overlapping the exhaust port 91c in the vehicle width direction, the cooling gas and the air flowing into the vicinity of the uppermost portion 22a of the exhaust space 22 flow forward and are smoothly discharged to the outside of the battery unit 20 through the exhaust port 91c. The higher-temperature cooling gas whose temperature is raised by cooling the battery modules 30 and the higher-temperature air whose temperature is raised by the heat generated in the junction board 52 can smoothly flow from the exhaust space 22 to the exhaust port 91c, and thus the higher-temperature cooling gas whose temperature is raised by cooling the battery modules 30 and the higher-temperature air whose temperature is raised by the heat generated in the junction board 52 can be smoothly discharged to the outside of the battery unit 20, and the cooling performance of the battery unit 20 is improved.

The upper wall portion 911 of the battery unit cover 91 includes, at the bulging portion 911a, an inclined portion 911c which is inclined upward toward the uppermost portion 911b. The inclined portion 911c extends in the vehicle width direction, and is formed such that a lower end portion 911d overlaps the junction board 52 when viewed from the upper-lower direction. Therefore, the exhaust space 22 includes an inclined portion 22b which is inclined upward toward the uppermost portion 22a. The inclined portion 22b extends in the vehicle width direction, and is formed such that the lower end portion 22c overlaps the junction board 52 when viewed from the upper-lower direction.

Therefore, the higher-temperature air whose temperature is raised by the heat generated in the junction board 52 flows upward, and thus flows toward the uppermost portion 911b along the inclined portion 22b. Accordingly, the higher-temperature air whose temperature is raised by the heat generated in the junction board 52 can be guided to the vicinity of the uppermost portion 911b, and thus the higher-temperature air whose temperature is raised by the heat generated in the junction board 52 can be more smoothly discharged to the outside of the battery unit 20 from the exhaust port 91c.

Although one embodiment of the present invention has been described above with reference to the accompanying drawings, it goes without saying that the present invention is not limited to such an embodiment. It is apparent to those skilled in the art that various variations and modifications can be conceived within the scope of the claims, and it is also understood that such variations and modifications belong to the technical scope of the present invention. In addition, the constituent elements in the above embodiment may be freely combined without departing from the spirit of the present invention.

At least the following matters are described in the present specification. In the parentheses, the corresponding constituent elements and the like in the above embodiment are shown as an example, and the present invention is not limited thereto.

(1) A battery unit (battery unit 20), including:
at least one battery module (battery module 30);
a cooling device (cooling device 40) configured to deliver a cooling gas configured to cool the battery module to the battery module, and
a junction board (junction board 52) mounted with a wiring component configured to electrically connect the battery module and an external device and allow a charging power and/or a discharging power of the battery module to flow, in which:
the junction board is disposed above the cooling device at a position where at least a part of the junction board overlaps the cooling device when viewed from an upper-lower direction.

According to (1), the junction board is disposed above the cooling device at the position where at least the part of the junction board overlaps the cooling device when viewed from the upper-lower direction, and air whose temperature is raised by heat generated in the junction board flows upward, and thus the air whose temperature is raised by the heat generated in the junction board can be prevented from being in contact with the cooling device. Therefore, the heat generated in the junction board can be prevented from being transferred to the cooling device, and thus the cooling gas supplied from the cooling device to the battery module can be prevented from rising in temperature due to the heat generated in the junction board. Accordingly, a lower-temperature cooling gas can be supplied to the battery module, and a cooling performance of the battery unit is improved.

(2) The battery unit according to (1), in which:
the cooling device includes:
a fan (fan 41) configured to blow the cooling gas; and
an introduction duct (introduction duct 42) connected to an aspiration port (aspiration port 41c) of the fan; and
the introduction duct is disposed between the junction board and the fan in the upper-lower direction.

According to (2), the introduction duct is disposed between the junction board and the fan in the upper-lower direction, and thus the junction board is disposed above the introduction duct and the fan is disposed below the introduction duct. Therefore, even if the heat generated in the junction board is transferred to the cooling device, since the introduction duct is disposed between the junction board and the fan in the upper-lower direction, the heat generated in the junction board can be prevented from being transferred to the fan. Further, since the fan is disposed below the introduction duct, the cooling gas which flows through a lower part of the introduction duct is aspirated into the fan. Therefore, even if the heat generated in the junction board is transferred to the introduction duct, in the cooling gas which flows through the introduction duct, the cooling gas which flows through the lower part of the introduction duct in which the heat generated in the junction board is less likely to be transferred is aspirated into the fan. Accordingly, the lower-temperature cooling gas can be supplied to the battery module, and the cooling performance of the battery unit is further improved.

(3) The battery unit according to (1) or (2), further including:
a battery unit cover (battery unit cover 91) configured to cover the battery module, the cooling device, and the junction board from above, in which:
the cooling device and the junction board are disposed on one side (right side) of the battery module in a first direction (vehicle width direction) orthogonal to the upper-lower direction;
the cooling gas is introduced into the battery module from a lower surface of the battery module, flows from a lower side to an upper side in the battery module, and is discharged from an upper surface of the battery module;
an exhaust space (exhaust space 22) surrounded by the battery unit cover is formed above the battery module; and
the upper surface of the battery module and an upper part of the junction board face the exhaust space.

According to (3), since the upper part of the junction board faces the exhaust space, the air whose temperature is raised by the heat generated in the junction board is discharged to the exhaust space. Therefore, together with the cooling gas which has cooled the battery module, the air whose temperature is raised by the heat generated by the junction board can be discharged to an outside of the battery unit. Accordingly, the air whose temperature is raised by the heat generated in the junction board can be prevented from staying inside the battery unit, and the cooling performance of the battery unit is further improved.

(4) The battery unit according to (3), further including:
an exhaust port (exhaust port 91c) configured to discharge the cooling gas discharged to the exhaust space to an outside of the battery unit, in which:
the exhaust port is provided on one side (front side) of the battery module in a second direction (front-rear direction) orthogonal to both the upper-lower direction and the first direction; and an uppermost portion (uppermost portion 22a) of the exhaust space is formed at a position overlapping the exhaust port in the first direction.

The higher the temperature of the gas, the higher the gas flows, and thus the higher the temperatures of the cooling gas whose temperature is raised by cooling the battery modules and the air whose temperature is raised by the heat generated in the junction board, the more the cooling gas and the air flow toward the vicinity of the uppermost portion of the exhaust space.

According to (4), since the uppermost portion of the exhaust space is formed at the position overlapping the exhaust port in the vehicle width direction, the cooling gas and the air flowing into the vicinity of the uppermost portion of the exhaust space flow in the second direction and are smoothly discharged to the outside of the battery unit through the exhaust port. Accordingly, a higher-temperature cooling gas whose temperature is raised by cooling the battery module and a higher-temperature air whose temperature is raised by the heat generated in the junction board can smoothly flow from the exhaust space to the exhaust port, and thus the higher-temperature cooling gas whose temperature is raised by cooling the battery module and the higher-temperature air whose temperature is raised by the heat generated in the junction board can be smoothly discharged to the outside of the battery unit, and the cooling performance of the battery unit is improved.

(5) The battery unit according to (4), in which:
the exhaust space includes an inclined portion (inclined portion 22b) which is inclined upward toward the uppermost portion; and
the inclined portion is formed such that a lower end portion (lower end portion 22c) overlaps the junction board when viewed from the upper-lower direction.

According to (5), the higher-temperature air whose temperature is raised by the heat generated in the junction board flows upward, and thus flows toward the uppermost portion along the inclined portion. Accordingly, the higher-temperature air whose temperature is raised by the heat generated in the junction board can be guided to the vicinity of the uppermost portion, and thus the higher-temperature air whose temperature is raised by the heat generated in the junction board can be more smoothly discharged to the outside of the battery unit through the exhaust port.

(6) The battery unit according to (4) or (5), in which:
the exhaust port is provided in the first direction at a position closer to the junction board than a center of the battery module in the first direction.

According to (6), in the first direction, the exhaust port is provided at the position closer to the junction board than the center of the battery module in the first direction, and thus the air whose temperature is raised by the heat generated in the junction board is more smoothly discharged to the outside of the battery unit through the exhaust port together with the cooling gas which has cooled the battery module. Accordingly, the air whose temperature is raised by the heat generated in the junction board can be further prevented from staying inside the battery unit, and the cooling performance of the battery unit is further improved.

(7) The battery unit according to any one of (3) to (6), in which:
the battery unit is mounted under a seat (rear seat RS) of a vehicle (vehicle V) such that the first direction extends in the vehicle width direction.

According to (7), the air whose temperature is raised by the heat generated in the junction board is prevented from staying inside the battery unit, so that even if the battery unit is mounted under the seat of the vehicle, heat generated in the battery unit can be prevented from being transferred to the seat of the vehicle. Accordingly, the battery unit can be mounted under the seat of the vehicle without impairing a commercial value of the seat, and the battery unit can be efficiently provided in a space of the vehicle.

(8) The battery unit according to any one of (1) to (7), in which:
the cooling device and the junction board are disposed on one side (right side) of the battery module in a first direction (vehicle width direction) orthogonal to the upper-lower direction, and
the cooling device and the junction board are disposed at a position where at least a part of each of the cooling device and the junction board overlaps the battery module when viewed from the first direction.

According to (8), the cooling device and the junction board are disposed such that at least a part of each of the cooling device and the junction board overlaps the battery module when viewed from the first direction, and thus the cooling device and the junction board can be disposed in the battery unit while preventing a height dimension of the battery unit.

The invention claimed is:
1. A battery unit, comprising:
at least one battery module;
a cooling device configured to deliver a cooling gas configured to cool the battery module to the battery module; and
a junction board mounted with a wiring component configured to electrically connect the battery module and an external device and allow a charging power and/or a discharging power of the battery module to flow, wherein:
the junction board is disposed above the cooling device at a position where at least a part of the junction board overlaps the cooling device when viewed from an upper-lower direction,
the cooling device includes:
a fan configured to blow the cooling gas; and
an introduction duct connected to an aspiration port of the fan; and
the introduction duct is disposed between the junction board and the fan in the upper-lower direction.

2. The battery unit according to claim 1, further comprising:
a battery unit cover configured to cover the battery module, the cooling device, and the junction board from above, wherein:
the cooling device and the junction board are disposed on one side of the battery module in a first direction orthogonal to the upper-lower direction;
the cooling gas is introduced into the battery module from a lower surface of the battery module, flows from a lower side to an upper side in the battery module, and is discharged from an upper surface of the battery module;
an exhaust space surrounded by the battery unit cover is formed above the battery module; and
the upper surface of the battery module and an upper part of the junction board face the exhaust space.

3. The battery unit according to claim 2, further comprising:
- an exhaust port configured to discharge the cooling gas discharged to the exhaust space to an outside of the battery unit, wherein:
- the exhaust port is provided on one side of the battery module in a second direction orthogonal to both the upper-lower direction and the first direction; and
- an uppermost portion of the exhaust space is formed at a position overlapping the exhaust port in the first direction.

4. The battery unit according to claim 3, wherein:
- the exhaust space includes an inclined portion which is inclined upward toward the uppermost portion; and
- the inclined portion is formed such that a lower end portion overlaps the junction board when viewed from the upper-lower direction.

5. The battery unit according to claim 3, wherein:
- the exhaust port is provided in the first direction at a position closer to the junction board than a center of the battery module in the first direction.

6. The battery unit according to claim 2, wherein:
- the battery unit is mounted under a seat of a vehicle such that the first direction of the battery unit extends in the vehicle width direction.

7. The battery unit according to claim 1, wherein:
- the cooling device and the junction board are disposed on one side of the battery module in a first direction orthogonal to the upper-lower direction; and
- the cooling device and the junction board are disposed at a position where at least a part of each of the cooling device and the junction board overlaps the battery module when viewed from the first direction.

* * * * *